(12) United States Patent
Bablumyan et al.

(10) Patent No.: US 6,407,848 B1
(45) Date of Patent: Jun. 18, 2002

(54) SERVO-STABILIZED-PHASE, DIFFERENTIAL COHERENCE DETECTOR

(75) Inventors: Arkady S. Bablumyan, La Jolla; Dmitry Berger; John N. Hait, both of San Diego; Bruce E. Smith, Santee, all of CA (US)

(73) Assignee: All Optical Networks, Inc., San Diego, CA (US)

( * ) Notice: Subject to any disclaimer, the term of this patent is extended or adjusted under 35 U.S.C. 154(b) by 27 days.

(21) Appl. No.: 09/753,504

(22) Filed: Dec. 27, 2000

(51) Int. Cl.$^7$ .............................. G02F 1/11; G02F 1/01; G02F 1/33; G02F 1/03; G02B 26/00
(52) U.S. Cl. ...................... 359/279; 359/285; 359/305; 359/246; 359/238
(58) Field of Search .................................. 359/245, 250, 359/247, 252, 237–239, 279, 285–287, 305, 321, 322, 246; 264/1.1; 343/786, 772, 909; 385/40, 42, 70

(56) References Cited

U.S. PATENT DOCUMENTS

| | | | |
|---|---|---|---|
| 4,506,388 A | 3/1985 | Monerie et al. | 455/616 |
| 4,718,120 A | 1/1988 | Tzeng | 455/619 |
| 4,723,316 A | 2/1988 | Glance | 455/619 |
| 4,965,858 A | 10/1990 | Naito et al. | 455/619 |
| 5,007,106 A | 4/1991 | Kahn et al. | 455/619 |
| 5,008,958 A | 4/1991 | Cimini, Jr. et al. | 455/619 |
| 5,027,436 A | 6/1991 | Delavaux | 455/619 |

(List continued on next page.)

OTHER PUBLICATIONS

Publication entitled "Balanced Phase and Polarization Diversity Coherent Optical Receiver," Langenhorst, Pieper, Eiselt, Rohde Weber, IEEE Photonics Technology Letters, vol. 3, No. 1, Jan. 1991.

Publication entitled "Phase– and Polarization–Diversity Coherent Optical Techniques," Kazovsky, Journal of Lightwave Technology, vol. 7, No. 2, Feb. 1989.

Publication entitled "All–Fiber 90° Optical Hybrid for Coherent Communications," Kazovsky, Curtis, Young Cheung, Applied Optics, vol. 26, No. 3, Feb. 1, 1987.

*Primary Examiner*—Georgia Epps
*Assistant Examiner*—William Choi
(74) *Attorney, Agent, or Firm*—Gary Eastman

(57) ABSTRACT

Multi-domain, phase-compensated, differential-coherence detection of photonic signals for interferometric processes and devices may be manufactured holographically and developed in situ or with an automatic registration between holograms and photonic sources in a single frame. Photonic or electronic post processing may include outputs from a cycling or rotation between differently phased complementary outputs of constructive and destructive interference. A hyper-selective, direct-conversion, expanded-bandpass filter may rely on an expanded bandpass for ease of filtering, with no dead zones for zero beat frequency cases. A hyper-heterodyning, expanded bandpass system may also provide improved filtering and signal-to-noise ratios. An ultra-high-resolution, broadband spectrum analyzer may operate in multiple domains, including complex "fingerprints" of phase, frequency, and other parameters. The associated technologies of the invention may be used to produce extreme precision in multi-domain locking of sophisticated waveforms varying in several domains. Phase-masking techniques may provide phased arrays of complementary outputs over a broad band, such as may be implemented in a projected phase-mask, multiple phase interferometer. Topographic holographic imaging and projection techniques are enabled at very fine resolutions, while minimizing required information for systems such as holographic television. Phase-stabilization, modulation, compensation and the like are enabled by devices and methods in accordance with the invention, and may be servo-controlled.

32 Claims, 30 Drawing Sheets

U.S. PATENT DOCUMENTS

| | | | |
|---|---|---|---|
| 5,060,312 A | 10/1991 | Delavaux | 359/192 |
| 5,081,712 A | 1/1992 | Meissner | 359/191 |
| 5,115,332 A | 5/1992 | Naito et al. | 359/189 |
| 5,117,469 A | 5/1992 | Cheung et al. | 385/11 |
| 5,127,066 A | 6/1992 | Poggiolini | 385/24 |
| 5,170,268 A | 12/1992 | Ewbank et al. | 359/7 |
| 5,253,097 A | 10/1993 | Naito et al. | 359/192 |
| 5,323,258 A | 6/1994 | Tsushima et al. | 359/190 |
| 5,440,414 A | 8/1995 | Kersey et al. | 359/122 |
| 5,535,045 A * | 7/1996 | Dutta et al. | 359/248 |
| 5,581,641 A | 12/1996 | Travis et al. | 385/12 |
| 5,659,412 A | 8/1997 | Hakki | 359/156 |
| 5,903,393 A | 5/1999 | Kalibjian | 359/618 |
| 5,986,784 A | 11/1999 | Kersey et al. | 359/122 |
| 6,151,155 A * | 11/2000 | Durfee, III et al. | 359/332 |
| 6,259,550 B1 * | 7/2001 | Gottfried-Gottfried et al. | 359/279 |

\* cited by examiner

*Photonic Fingerprint*

Absolute Value Differential Detector With Beat Frequency Multiplication

SERVO-STABILIZED-PHASE, DIFFERENTIAL COHERENCE DETECTOR

BACKGROUND

1. The Field of the Invention

This invention relates to signal processing of light waves and other electromagnetic radiation and, more particularly, to novel systems and methods for detection and use of coherent photonic signals in various applications.

2. Background

Coherence detection using interference is an important element of signal processing for optical signals. In general, when a signal is to be detected, the detection process relies on transmission and receipt of a signal having a value a substantial distance from a value of some base noise level. In order to detect a signal, some window of bandwidth at which the signal is expected to occur will be selected. In order to provide more channels of data, it is desirable to be able to narrow down the bandwidth that is required to receive a particular signal.

Broadcasting or transmitting a signal precisely, with a minimum of noise at other frequencies, is important. Likewise, filtering and detecting a received signal over a narrow band, despite any associated noise, is important for communication. Narrowing the bandwidth of operation of a receiving apparatus requires a filter. Such a filter requires, in the case of optical systems, detection of the coherence of a signal using interference, and thus the applicability of that signal to the frequency range of interest.

As the relative phase of two coherent signals changes, the difference between the constructive interference (CI) and destructive interference (DI) outputs of an interferometer reduces as the phase difference approaches 90 degrees. Thus, a dead spot exists when differential detection is used, and when the two signals are out of phase by 90 degrees. Thus, coherence detection is phase-sensitive. What is needed is a method and apparatus for phase-insensitive coherence detection.

BRIEF SUMMARY AND OBJECTS OF THE INVENTION

In view of the foregoing, it is a primary object of the present invention to provide a method and apparatus for phase-insensitive coherence detection. It is another object of the invention to account for the dead spot that occurs when the phase difference is 90 degrees. It is another object of the invention to avoid any dead spot in the bandwidth of a coherence detector by modifying the input to an interferometer. It is another object to avoid a dead zone or dead spot when the phase difference is 90 degrees by modifying the output of an interferometer.

Further objects of the invention include providing a phase and frequency insensitive detection of coherence in photonic signals. It is yet a further object of the invention to provide a sensor for telecommunications lines, for receiving photonic signals, narrowing the required bandwidth necessary for effective capture of a received signal. It is another object of the invention to provide various apparatus implementing coherence detectors therein, for example: spectrum analyzers, signal processors, and so forth. Another object is to expand bandwidth for greater selectivity.

Consistent with the foregoing objects, and in accordance with the invention as embodied and broadly described herein, a method and apparatus are disclosed in one embodiment of the present invention provide multi-domain, phase-compensated, differential-coherence detection of photonic signals for interferometric processes. Manufacture of devices holographically and repeatably is done with emulsion development in situ or with removablek, automatic registration structures connecting and registering holograms and photonic sources with respect to each other in a single frame.

Photonic or electronic post processing may include outputs from a cycling or rotation between differently phased complementary outputs of constructive and destructive interference. A hyper-selective, direct-conversion, expanded-bandpass filter may rely on an expanded bandpass for ease of filtering, with no dead zones for zero beat frequency cases. A hyper-heterodyning, expanded bandpass system may also provide improved filtering and signal-to-noise ratios. An ultra-high-resolution, broadband spectrum analyzer may operate in multiple domains, including complex "fingerprints" of phase, frequency, and other parameters.

The associated technologies of the invention may be used to produce extreme precision in multi-domain locking of sophisticated waveforms varying in several domains. Phase-masking techniques may provide phased arrays of complementary outputs over a broad band, such as may be implemented in a projected phase-mask, multiple phase iterferometer. Topographic holographic imaging and projection techniques are enabled at very fine resolutions, while minimizing required information for systems such as holographic television. Phase-stabilization, modulation, compensation and the like are enabled by devices and methods in accordance with the invention, and may be servo-controlled.

Coherence detection may rely on an interferometer called a homodyne. A homodyne may require a single interferometer having sensors such as photodiodes, or other elements for detecting the light signal output, and forwarding a communications signal to a device. In a homodyne, adjustment typically provides for one sensor "detector" to receive energy from a region of destructive interference "DI" of two photonic beams. Another region may provide an area of constructive interference "CI" due to an interference pattern between the two photonic beams.

When two photonic inputs into an interferometer are coherent, two outputs provide a differential with respect to one another. If non-coherent light arrives as inputs, then outputs to the two sensors or detectors will lack the pronounced differential, and may effectively be non-differentiable. A differential detector for measuring the overall difference between the two signals received at the two sensors may thus determine if coherence exists. The existence of coherence can be used to indicate that a signal at a desired or expected frequency is arriving at the detectors to be processed.

Within contemplation is an embodiment of an apparatus in accordance with the invention in which a portion of a differential output provides a feedback signal to a servo circuit. This servo circuit controls an electrically driven or control phase-adjusting optical element in a photonic input pad leading to an interferometer. In one embodiment, the servo mechanism so constructed can change the phase of an input signal to avoid any dead spot near the 90 degree or quarter wave zone. As a result, any phase change that occurs between two inputs may be tracked by a servo in order that the differential output of an interferometer will be continuously adjusted to avoid any dead zone or dead spot condition.

In an alternative embodiment, the 90 degree or quarter-wave dead spot may be avoided in an output signal by providing at least two interferometers energized by a shared input signal. Accordingly, one input of one of the interferometers may be optically phase shifted so that at least one of the interferometers provides a differential output when the two inputs are coherent. The two differential outputs may then be combined into a single, phase-insensitive output.

In one embodiment, coherence detection may be implemented in a narrowband active optical filter or photonic active filter. A signal selection process may be useful in a demultiplexer, such as a wave division multiplexer (WDM) or a time division multiplexer (TDM). Coherence detection elements based on interference between a detected incoming signal, and a reference signal, may provide extremely narrowband selection allowing a significant increase in the channel-carrying capacity of an optical communication system.

In certain embodiments, a coherence detector implemented as a filter in a wavelength demultiplexing system may be used for precise wavelength measurements, thus forming a spectrum analyzer. A phase-insensitive method and apparatus for coherence detection is essential, and may be accomplished by splitting an input signal, and a reference signal, into a number of individual beams, each having substantially equal intensity, but different directions of propagation.

The beams may then be recombined using beam combiners, such as certain types of beam splitters, and directed along a shared optical path. The light intensity in each channel may be detected by a detector such as a photodiode or other appropriate sensor. Ultimately, output signals from each sensor may be compared in a differential circuit. When multiple interferometers are used, multiple pairs of sensors are provided.

Each pair of sensors provides a differential output. These differential outputs are then combined electrically to provide a coherence status outputs signal. The interferometers are organized as discussed above to provide at least one differential output whenever the phase difference between the input and reference signals is within 90° relative phase values of 0, 90, 180, or 270 degrees. These differential status outputs result whenever coherence is achieved, regardless of the relative phase. By covering the full range of 360°, the usual dead spots are eliminated.

By appropriate selection of a frequency between a reference signal and an incoming signal, one may achieve a condition wherein all channels of a multiplexed or other system have different light intensities. Each intensity corresponds to a particular value of an initial phase of an incoming signal. In such a case, an output signal from a differential circuit may be obtained, provided that the oscillation rate of an interferometric pattern is within the bandwidth of a particular detector, such as a photodiode.

Additional details in certain embodiments, provide a method of phase-insensitive coherence detection may include providing two beams of electromagnetic energy, producing interference between a portion of the first beam and a portion of the second beam in an interferometer. Outputs of the interferometer may have a relative differential when the beams are coherent, and have a phase difference other than a quarter-wave position, or a 90 degree phase difference. Meanwhile, a method in accordance with the invention may produce interference between a second portion of the original beam, and a phase shifted portion of the second beam, through a second interferometer. Outputs of the second interferometer may have a relative differential when the beams are coherent, and have a phase difference other than a quarter-wave position, or a 90 degree phase difference.

In one presently preferred method in accordance with the invention, energy may be detected from the first and second photonic signals, using a first differential detection means to provide a first differential signal, and using a second differential detection means to provide a second differential signal. Thereafter, the first and second differential signals may be combined to provide a coherence detection output or a status detection for the coherence of the first and second photonic signals. Accordingly, the output may change when the first and second beams are coherent, regardless of any phase difference between the first and second photonic beams originally input.

In one embodiment, a method and apparatus in accordance with the invention may stabilize coherence detection by providing first and second beams of electromagnetic energy, and directing the second beam through a servo-controlled phase adjustment mechanism in order to provide a phase-correct beam. Thereafter, interference may be produced between the first beam and the phase corrected beam in an interferometer in order to produce a differential output when the first and second beams are coherent.

Detecting the differential signals may then provide at least one output in the feedback signal into a servo-controlled phase adjustment mechanism in order to adjust the phase of the phase-corrected beam. Accordingly, the condition is avoided wherein the phase difference between a phase-corrected beam and the original first beam is ever 90 degrees. Accordingly, the differential levels are stabilized, eliminating any singularity (dead zone) at the 90 degree or quarter-wave difference position. Thus, coherence detection is provided in a phase-insensitive way.

In certain embodiments, an apparatus and method in accordance with the invention may provide extremely high resolution phase comparison of numerous photonic signals, simultaneously. Such a mechanism and method are possible in conjunction with a two-dimensional phase mask, a two-dimensional beam splitter, a two-dimensional lens matrix, a two-dimensional sensor matrix, or the like. In certain embodiments, parallel processing of photonic spectra may be provided through numerous paralleled channels. Numerous sets of double channels may be provided or large sets of small groups of channels may be provided. A very fine, almost infinitesimally fine, resolution of a single channel or a single set of channels may be approachable.

Application of the methods and apparatus in accordance with the invention to broadband applications may depend on the bandwidth of available photonic or other wave-type reference sources. For example, reference sources maybe in the visible spectrum, infrared, ultra violet (UV), acoustic, or the like. The ratio of the size of an aperture to a particular wave length being used may effect the bandwidth of applicability to an apparatus and method in accordance with the invention.

In one embodiment, an apparatus and method in accordance with the invention may operate over multiple sets of dual channels. The sets of dual channels may each have a coherence status that may be detected individually. In one embodiment, an extremely fine resolution of coherence status may be determined for many pairs of channels. Alternatively, sets of channels may have more than two channels, but may still have extremely fine resolution of coherence. In certain embodiments, certain sets of channels can be of the same frequency, or sets of channels may be at different frequencies.

When the reference and input signals have different frequencies, the combined waves in the interferometer, or interferometers, as appropriate, naturally sequence through 360° of phase differences at a beat frequency rate. A method and apparatus in accordance with the invention are so organized as to exploit this phenomenon. By arrangement of the phase-adjusted interferometers, the energy of constructive interference, and its destructing interference complement, along with the energy differential presented to any sensor, sequences the energy through the set of sensors. The result is a multiplying of the beat frequency for all signals that are not zero-beat with respect to the reference.

In addition, an absolute value and other frequency multipliers can be used. This provides an expanded bandpass that may render easier subsequent filtering. The entire receiver can be made more selective. The term hyper-resolution has been applied to the resulting increase (improvement) in the degree of resolution, and consequent increase in selectivity.

Applications for detection in accordance with the invention may include molecular spectroscopy, pharmaceutical identification of compositions, and resolution of astronomical emission spectra. Increased subdivision of signal bandwidth may greatly augment wave-division multiplexing.

Coherence detection in accordance with the invention may be used for high speed identification of the emission spectra of exhaust plumes from rockets or missiles. A scanner or detector for interference may rely on coherence detection in accordance with the invention. Other applications may include echo location in wave-transmitting media, whether ultra sonic, audible, or other sonar ranges. Medical sonographic data collection and analysis, including ultrasound detection, ultrasound imaging, dynamic signal processing imaging, dynamic signal processing, post processing analysis, spectra analysis, spacial analysis, or the like may be provided. Reflectometry, or Time-Delay Reflectometry (TDR), precise analysis in real time of TDR data, may rely on coherence detection in accordance with the invention.

Frequency locking of one or more wave sources with respect to a stationary reference wave source, whether an oscillator or frequency standard, may provide numerous advantages and much higher speeds using photonic coherence detection. Frequency locking of one or more wave sources to a non-stationary wave source, such as may be applied to frequency tracking, FM demodulation, frequency monitoring, frequency stabilization, Doppler shift tracking, and the like may also benefit from a filter system corresponding to an apparatus is accordance with the invention.

Phase locking of one or more wave sources to a stationary wave source in a light spectrum, such as a laser mode locking apparatus is also contemplated. Likewise, another application is phase locking of one or more wave sources to a non-stationary electromagnetic wave source, such as a phased-locked loop, FM demodulation, phase monitoring, or phase tracking may rely on coherence detection systems in accordance with the invention.

Likewise, parallel processing of information generated by non-photonic sources, such as seismic data processing, as well as sonar, radar, and other information processing may rely on coherence detection systems in accordance with the invention. Dynamic noise emission analysis with respect to spatial locations, spectral analysis, and active or dynamic noise cancellation processes may be executed at sufficiently high speeds using photonic coherence detection in accordance with the invention. For example, active or automatic noise-emission reduction for automobiles, aircraft, and the like are contemplated. Similarly, engine noise may be abated by tracking an active reduction by servo mechanisms, providing precisely-selected frequencies, according to the change in frequencies of such noise-producing elements as engines, turbines, and the like.

In summary, various embodiments of apparatus and methods in accordance with the invention may provide for detection of coherence in multiple domains for a waveform, and using the lack of or presence of coherence to perform a multiplicity of useful functions. Some of those functions include phase-insensitive coherence detection, multi-domain differential coherence detection, holographic manufacture in-place for lenses and holograms in order to maintain more precise registration of components, and various types of electronic and photonic signal processing and post-detection processing. Also available are functions including hyper-sensitive bandpass filtering at zero beat frequency, such as the hyper-selective, direct-conversion filtering apparatus and method. Hyper-heterodyning, expanded bandpass apparatus and methods are also available. Hyper-resolution, broadband spectrum analyzers and multi-dimensional, photonic waveform fingerprint analyzers are also contemplated. The technology may also produce a frequency-locked photonic loop, a phase-compensated coherence detection interferometer and a multiple-phase-mask interferometer with a broadband phase mask, relying on a projected phase mask.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention, they are, therefore, not to be considered limiting of its scope. The invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 28, is not intended to limit the scope of the invention, as claimed, but is merely representative of the presently preferred embodiments of the invention.

The presently preferred embodiments of the invention will be best understood by reference to the drawings, wherein like parts are designated by like numerals throughout. Those of ordinary skill in the art will, of course, appreciate that various modifications to the details of the illustrations may easily be made without departing from the essential characteristics of the invention, as described in connection therewith. Thus, the following description of the Figures is intended only by way of example, and simply illustrates certain presently preferred embodiments consistent with the invention as claimed herein.

Figure 1:
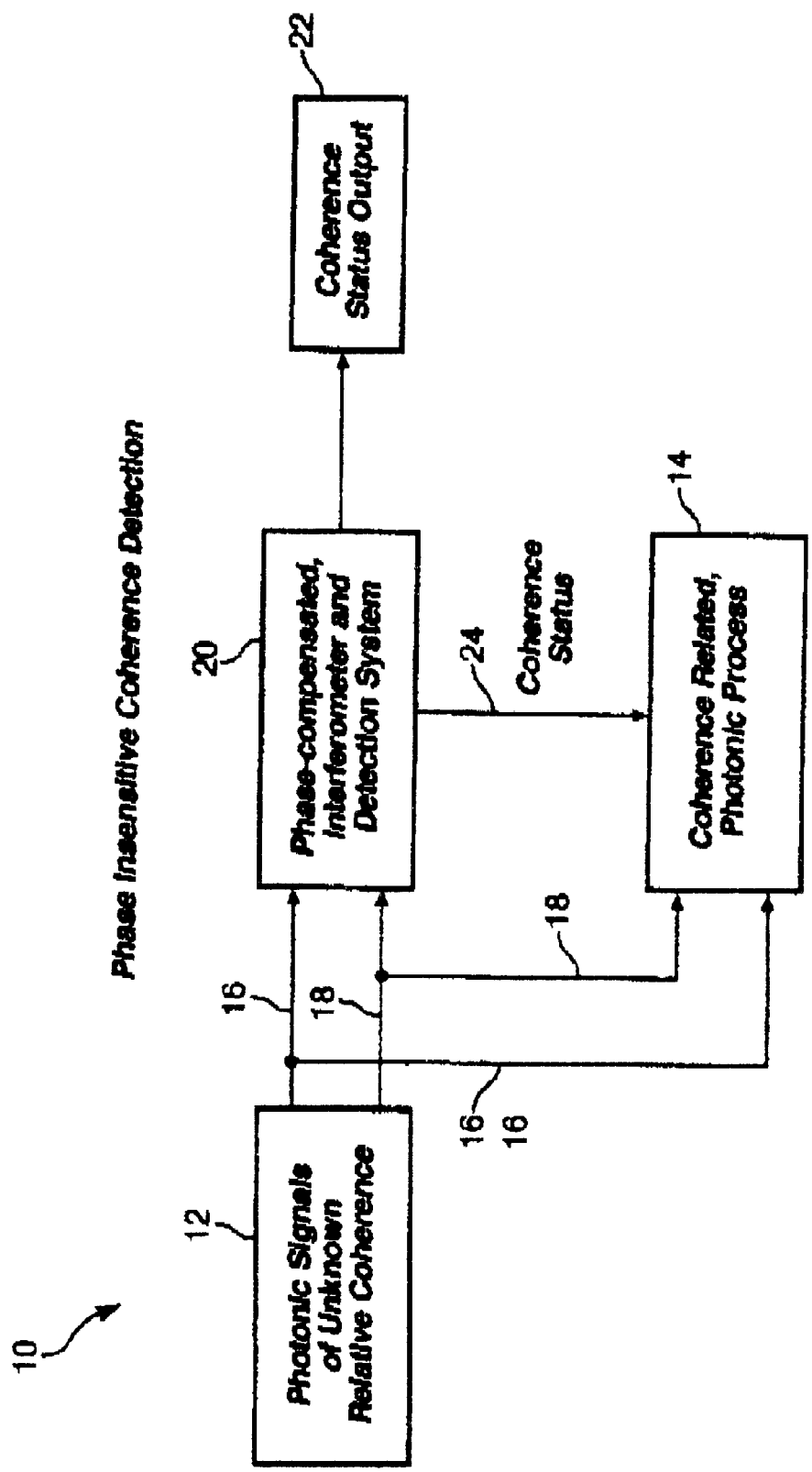
FIG. 1 is a schematic block diagram of an apparatus and method in accordance with the invention for phase-insensitive coherence detections.

Referring to FIG. 1, photonic signals 12, or sources 12 providing photonic signals, maybe important for some particular process 14. The process 14 maybe depend on the condition that signals 16, 18 are coherent with respect to one another. Coherence involves certain physical properties characterizing the signals 16, 18 and may be defined in various ways.

One useful definition of coherence is a property of systems having wave energy. That is, coherence relates to properties of wave energy that permit or cause wave interference phenomena to occur. Wave interference phenomena are characterized by a spatial redistribution of energy as a result of the interference. For example, the interference of wave energy may be redistributed into regions of constructive interference and destructive interference. Likewise, two coherent signals or sources of coherent signals may produce waves that have the capacity to produce constructive and destructive interference if allowed to interact.

In order to determine the relative coherence between the signals 16, 18, an interferometer and detection system 20 may receive both the signals 16, 18. This is performed in order to produce a coherence status output 22 to an individual or device capable of using that information. Likewise, the system 20 may provide information to a coherence status line 24 enabling a process 14 to use information in the signals 16, 18. The coherence related process 14 may actually require a lack of coherence. Alternatively, the process 14 may require coherence. In general, the process 14 is sensitive to coherence, and therefore requires, benefits, or can otherwise make use of the coherence information provided on the coherence status line 24 from the system 20.

Sources 12 or signals 16, 18 may vary in their phenomena, purpose, locations, distribution, and so forth. For example, electromagnetic radiation comes from various sources and spectra including radio frequencies, visible spectra, and the like. Moreover, physical phenomena may actually be sources 12 for mechanical waves. Similarly, coherence related processes 14 may include processes that originate the signals 16, 18, and require either feeding forward or feeding back coherence information. Thus, the source 12 and the process 14 may be the same physical device or process. The status output 22 may feed to another process, or may be thought of as an instrumentation or measurement function. For example, data extraction, data display, and output of measurements or diagnostic data may all result from the coherence status output 22.

Figure 2:
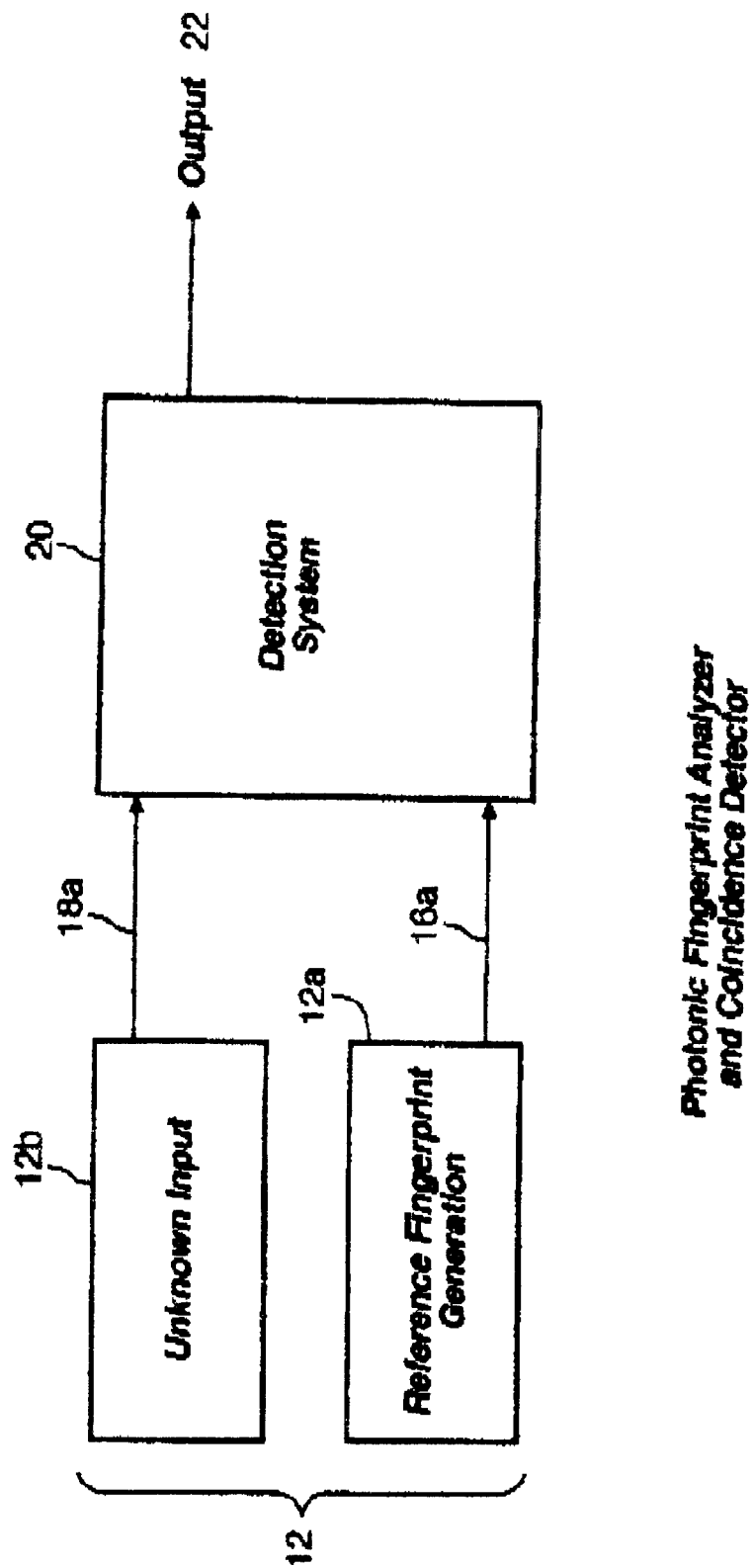
FIG. 2 is a schematic block diagram of a photonic fingerprint analyzer relying on coincidence detection.

Referring to FIG. 2, an alternative embodiment of an apparatus 10 may include a reference-fingerprint signal generator 12a. The generator 12a may include a synthesizer for synthesizing a signal 16, 18, as a fingerprint reference. Similarly, the generator 12a may provide a reference signal that has been previously recorded, saved, transmitted, or the like for the purpose of comparison. Accordingly, the generator 12a may provide a reference signal 16a.

Meanwhile, a source 12b, providing a signal 18a of unknown character relative to the signal 16a, may provide another input to the apparatus 20. Unknown characteristics of the signal 18a may include frequency, amplitude, timing, waveform, and the like.

Figure 3:
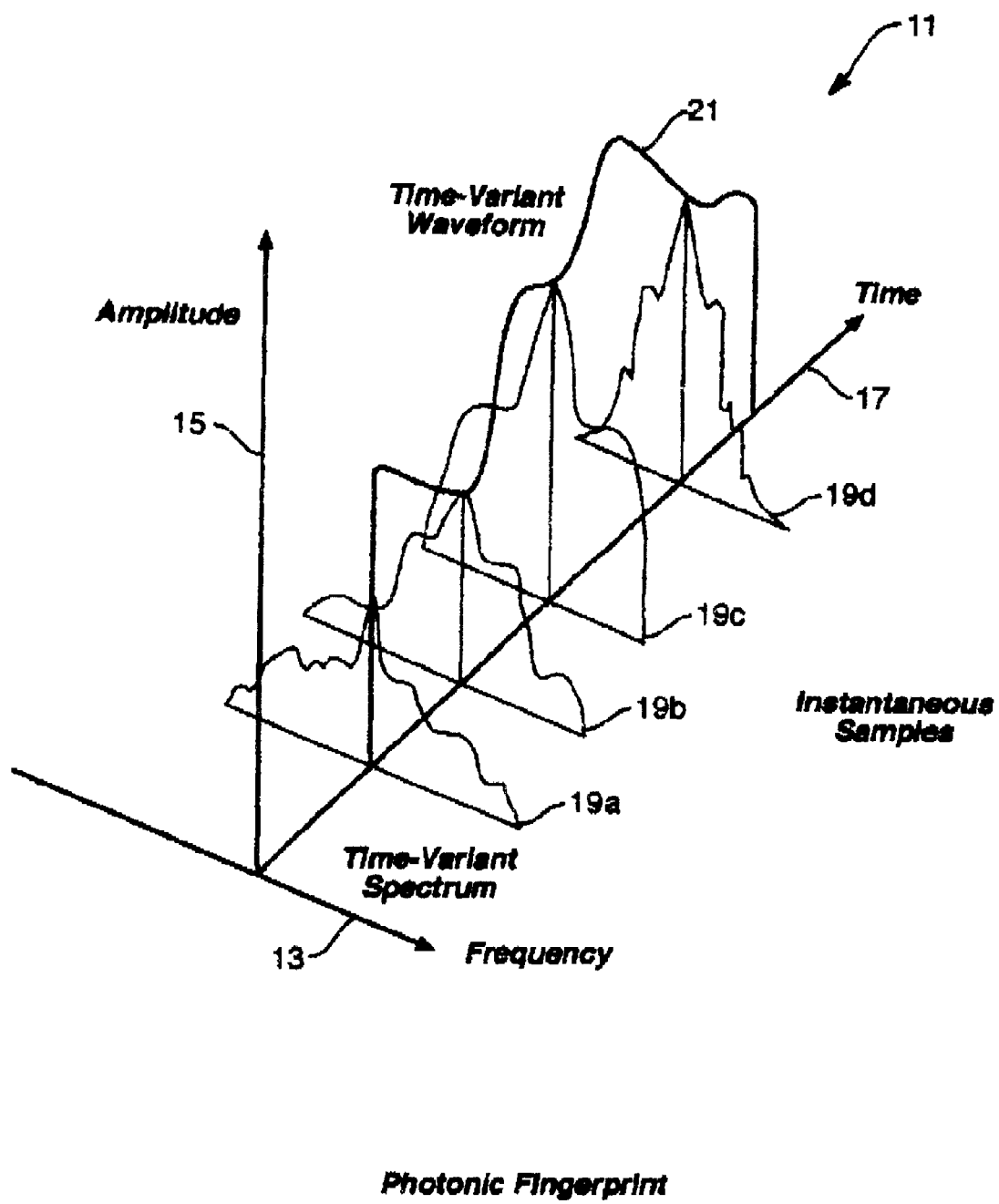
FIG. 3 a schematic illustration of a fingerprint waveform illustrating variations in multiple dimensions.

Referring to FIG. 3, a wave-energy signature 11 or fingerprint 11 may be characterized by parameters reflected in various axes 13, 15, 17. By a signature 11 is meant a waveform having certain characteristics. For example, the signal 11 may be characterized by variations in frequency 13, amplitude 15, time 17, and repeating patterns thereof. Accordingly, the waveform 21 characterizing the signature 11 may vary in frequency 13, amplitude 15, and time 17. For example, cross-sections 19a–19d, illustrate the profiles 19 corresponding to the waveform 21 at distinct times 17. Additional domains in which the waveform 21 may vary may include polarization, phase, degree of discretization, and repetitions thereof For example, photons of discrete frequencies may appear, resulting in a discontinuous waveform 21. Meanwhile, conventional digital and analog signals may also be represented as waveforms 21. Moreover, the waveform 21 may actually exist in any suitable medium. Typically, in the electromagnetic spectra of interest, communications, imaging, detection, instrumentation, and the like are typical applications. Nevertheless, other physical phenomena including acoustics, and ultra sonic systems, as well as other mechanical phenomena may actually benefit from the apparatus 10 and methods in accordance with the invention. Any wave-type phenomenon may raise the issue of coherence.

In one embodiment, an apparatus and method in accordance with the invention may be thought of as providing one signal 16, 18 as a template against which the other signal 18, 16 is to be compared. Again, the parameters contained in the template may be any of the parameters identified with respect to the signature 11 of FIG. 3. In certain embodiments, the signature 11 characterized by a waveform 21 may actually vary in space as well as the other previously mentioned parameters. Accordingly, a waveform 21 may be a signature image varying in any number of domains, including: frequency, amplitude, time, pattern, etc., as well as doing so throughout a space. Thus, the waveform 21 may actually be an image waveform, and the signature 11 may be a multi-dimensional, multi-variant signature.

Figure 4:
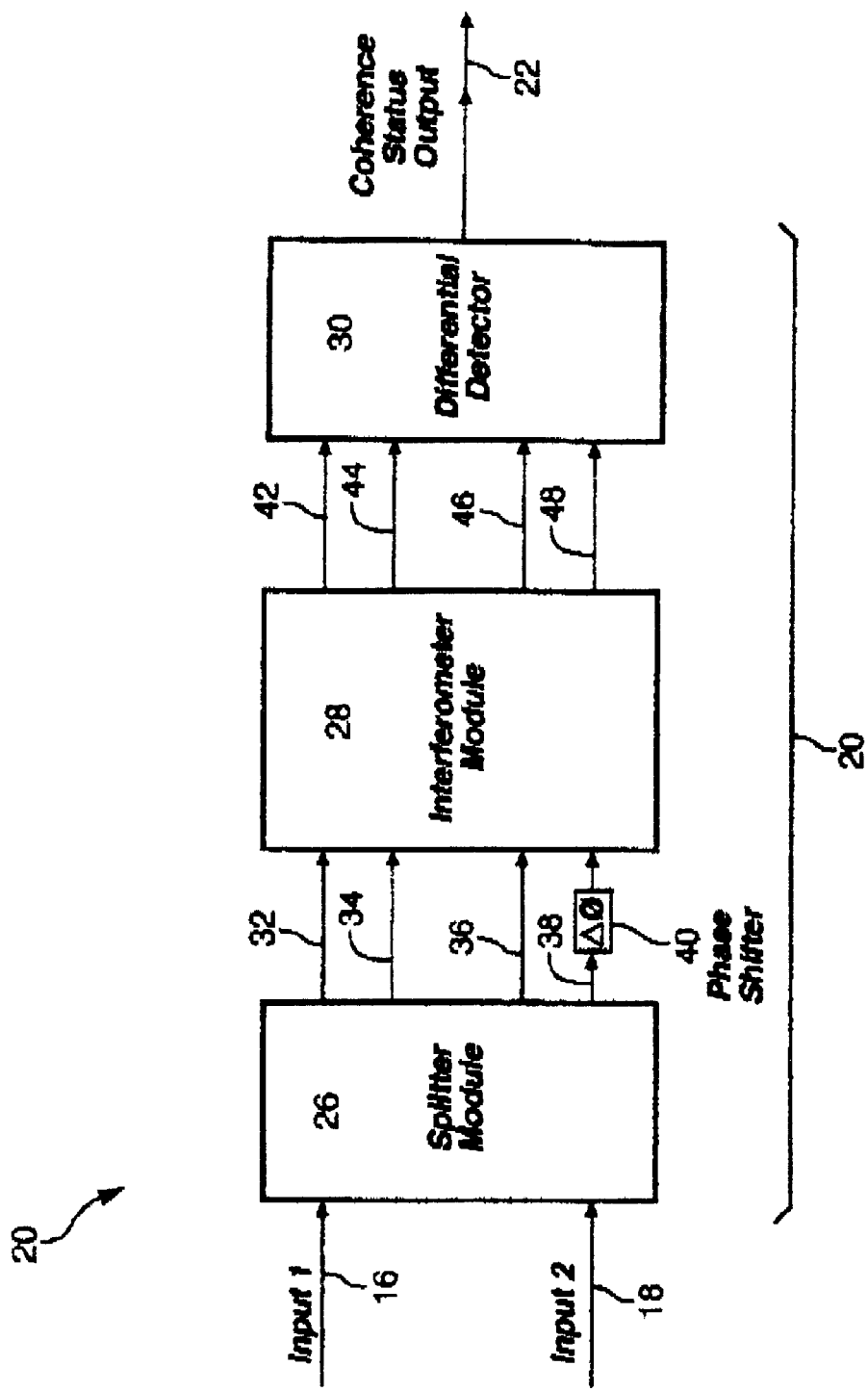
FIG. 4 is a schematic block diagram of a phase-compensated interferometer and detection system in accordance with the apparatus of FIG. 1.

Referring to FIG. 4, an apparatus 10 may include a phase compensated interferometer and detection system 20 for receiving the inputs 16, 18. A splitter module 26 may include one or more splitters capable of receiving the signal 16, 18 and producing for each, a corresponding, respective set of daughter signals 32, 34, 36, 38. Thus, the daughter signals 32, 34 have the same waveform, absent amplitude, as the input 16, and the signals 36, 38 have the same waveform, absent amplitude, as the input 18. Thus, although amplitude may vary as a result of the splitter module 26, rendering the signals 32, 34 not identical in amplitude, and the signals 36, 38 not identical in amplitude, amplitudes may be identical, but need not be exactly equal.

Nevertheless, in one presently preferred embodiment, the amplitudes in the signals 32, 34 are as nearly identical as feasible, and the amplitudes of the signals 36, 38 are as nearly identical as feasible. The splitter module 16 splits the energy from the inputs 16, 18 among the signals 32, 34, 36, 38 fed into the interferometer module 28. Meanwhile, the interferometer 28 provides complementary outputs 42, 44 and 46, 48 to be processed by the differential detector 30. The differential 30 then outputs a signal 22 reflecting the coherence status of the input signal 16, 18.

Figure 5:
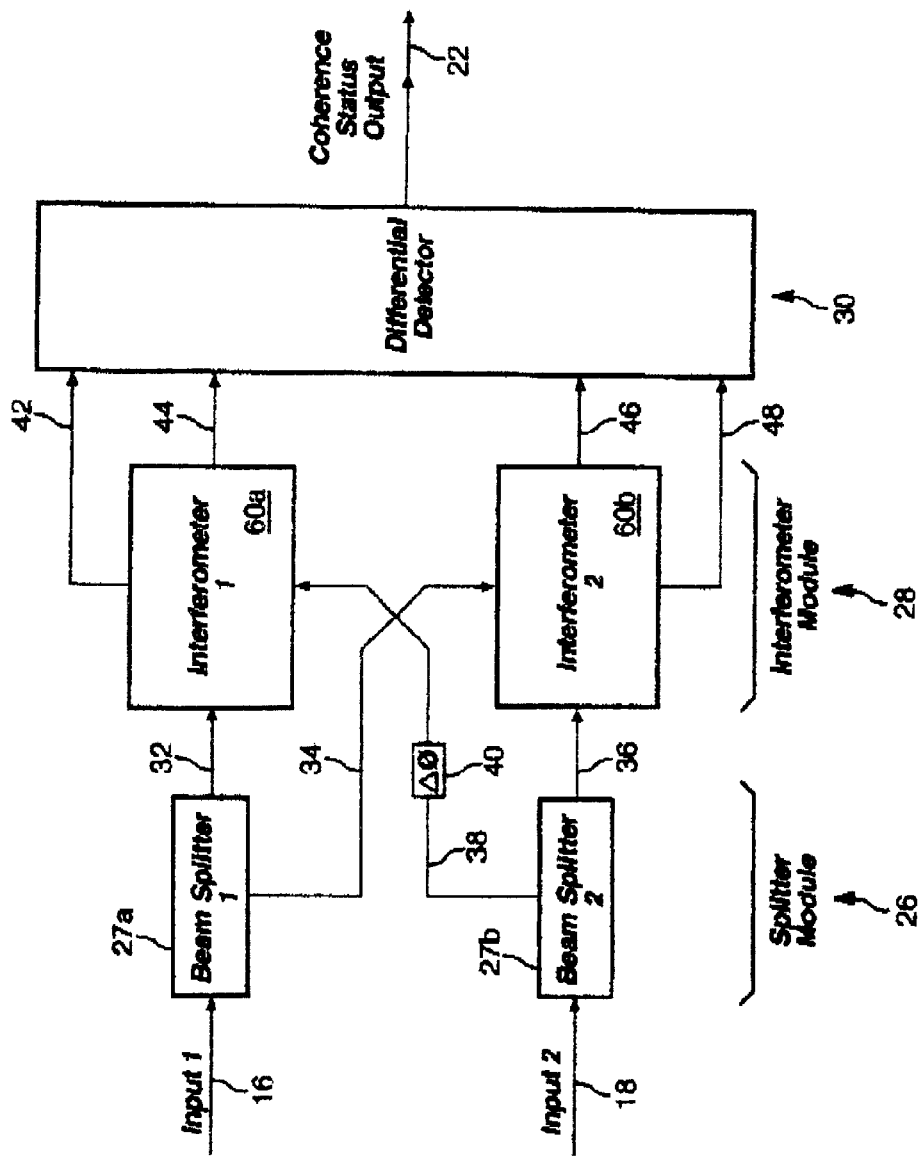
FIG. 5 is a schematic block diagram illustrating certain selected embodiments of a splitter module and interferometer module.

Referring to FIG. 5, the splitter module 26 may include beam splitters 27a, 27b. In this particular embodiment, the interferometer module 28 may include interferometers 60a, 60b operating 90 degrees out of phase. The daughter signals 32, 34 from the input 16, pass from the beam splitter 27a to the interferometers 60a, 60b, respectively. Similarly, the daughter signals 36, 38 from the input 18 are passed to the interferometer 60a, and the interferometer 60b respectively. A phase adjuster 40 may adjust the signal 38 in order to assure the interferometers 60a, 60b properly process the signals 32, 34, 36, 38. That is, because the interferometers 60a, 60b operate 90 degrees out of phase, the signal 38 must be phase shifted by 90 degrees by the phase shifter 40, or through the alignment and positioning of elements therein.

A variety of photonics elements, including optical, electrical magnetic, radio frequency, and the like may be used in the role of the phase shifter 40. For example, simple differences in path may be engineered through changes in refractive index, passage through standard optical elements, digital delay systems, and the like as a phase shifter 40 to produce the 90-degree shift.

The differential detector 30 receives complementary signals 42, 44, and 46, 48. As in FIG. 4, the complementary outputs 42, 44, 46, 48 represent substantially the total energy from their respective interferometers 68a, 68b. Thus, constructive and destructive interference, or non-interference may affect the energy outputs of each of the signals 42, 44, and 46, 48 into the differential detector 30.

Figure 6:
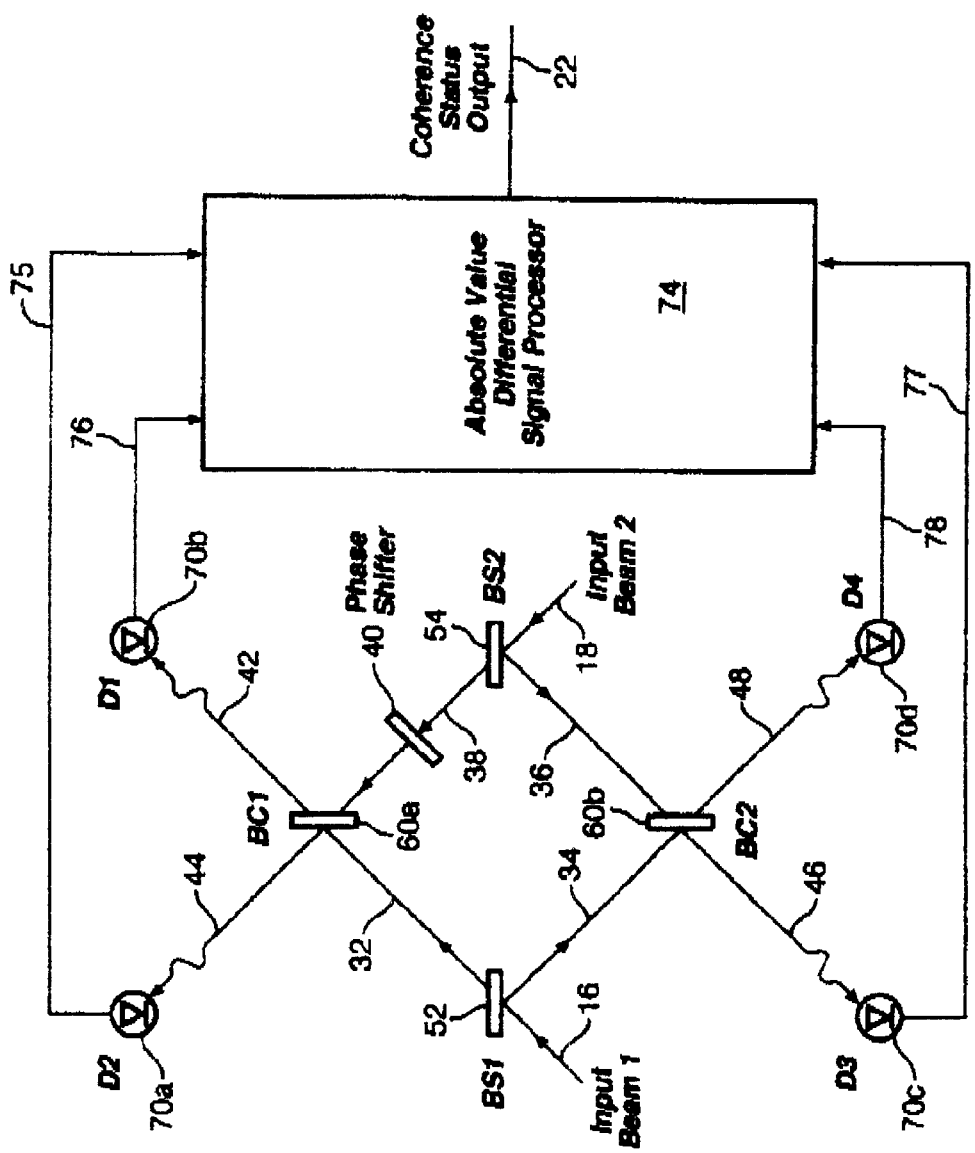
FIG. 6 is a schematic block diagram of an apparatus in accordance with the invention illustrating one embodiment for distributing beam splitters and beam combiners in conjunction with a phase shifter in order to provide differential outputs detected by a differential detector, including an absolute value differential detector in one embodiment.

Referring to FIG. 6, the input signals 16, 18 are split by the beam splitters 52, 54, respectively, the signal 16 is split into signals 32, 34 passing two interferometers 60a, 60b. A portion of the input signal 16 passes through the beam splitter 52, becoming the signal 32 provided to a beam combiner 60a. A combiner 60a may be a Mach-Zehnder interferometer in one embodiment. Meanwhile, the signal 18 is split, producing a signal 38 passed to the second input location associated with the interferometer 60a. The signal 38 undergoes a phase shift in the phase shifter 40, since the interferometer 60a is 90 degrees out of phase with the interferometer 60b.

Similarly, a portion of the input beam 16 is reflected from the beam splitter 52, becoming the signal 34 passed to the interferometer 60b acting as a beam combiner 60b. The beam 18 is partially reflected from the beam splitter 54 as the signal 36, passed to another input of the interferometer 60b.

Due to the difference in phase between the interferometers 60a, 60b, the detectors 70a, 70b, 70c, 70d will receive, selectively, either a constructive interference, a destruction interference, or another signal having an energy condition dependent upon the relative coherence between the input signals 16, 18.

In the illustrated embodiment, an absolute value differential 74, or detector 74, receives signals 75, 76, 77, 78 from the respective detectors 70a, 70b, 70c, 70d. An objective of an apparatus 10 is to produce an output 22 reflecting the coherence or lack thereof of signals 16, 18 with respect to one another. Each of the signals 16, 18 may exist in multiple dimensions as a particular waveform 21. If the waveforms 21 corresponding to the input signals 16, 18 are "matching" and coherent, a differential will exist between the comparative outputs of two or more of the detectors 70a–70c. The differentials between the signals 70a–70b and 70c–70d may be processed by the signal processor 74. The signal processor 74 and detectors 70, together, form the differential detector 30.

In a condition wherein the input signals 16, 18 are not coherent with respect to one another, energy contributions to each of the detectors 70a, 70b, 70c, 70d, are substantially the same, that is the splitters 52, 54 and the interferometers 60a, 60b distribute the energy without the interference characteristic of coherence. As a result, no differential exists between the detectors 70a, 70b or the detectors 70b, 70c. Accordingly, the absolute differential signal processor 74 provides an output 22 reflecting a lack of coherence. That is, no substantial differential results in the signal processor 74, and thus the output 22 indicates a lack of coherence. In another condition, the inputs 16, 18 may be coherent, and phase-stable. In this condition, a differential exists between two or more of the sensors 70a, 70b, 70c, 70d. Accordingly, the signal processor 74 recognizes the differential between two or more of the detectors 70, and produces a corresponding output signal 22 reflecting coherence.

For example, one such condition may involve the signal 16 and the signal 18 coherent and in phase. Accordingly, one of the detectors 70c, 70d will have constructive interference, and the other will have destructive interference. Accordingly, the signal processor 74 will receive a high energy signal, and a low energy signal. For example, the signal 77 may be a high energy (constructive interference) and the signal 17 may be a low energy (destructive inference) signal. Thus, the signal processor 74 produces a status output 22 reflecting coherence.

In a similar condition, the inputs 16, 18 may be out of phase by 180 degrees. In that condition, with respect to the former example, the detector 70d may produce a signal 78 reflecting constructive interference and having a high energy value. Accordingly, the detector 70c may produce a low energy signal 77 reflecting destructive interference. Thus, the sense of the constructive and destructive interference of the detectors 70c, 70d has been reversed from the "in-phase" condition. Thus, the absolute value differential signal processor 74, since it operates on an absolute value basis, produces an affirmative output 22 on coherence, regardless of the phasing of the input signals 16, 18.

Meanwhile, the interferometer 60a, being 90 degrees out of phase with the interferometer 60b, provides in the signals 42, 44 substantially equal energy contributions to each of the detectors 70a, 70b. Accordingly, no substantive differential exists between the outputs 75, 76 corresponding thereto. Therefore, the signal 75, 76 do not contribute to the output 22 of the signal processor 74.

In another example, the inputs 16, 18 may each reflect a waveform 21 coherent and phase stable with respect to one another. Because the signals 16, 18 are coherent and phase stable, one of the signals 16, 18 serves as a template for the other signal 18, 16, regardless of the complexity of the waveform 21. The result, is that the output 22 from the signal processor 74 reflects the actual waveform 21. Because the waveforms 21 of the input signals 16, 18 are coherent in multiple domains, the coherence output 22 will reflect the coherence of every domain in which coherence exists. To the extent that any domain of the waveform 21 lacks coherence between the input signals 16, 18, the output 22 will lack the same coherence in that particular domain.

Figure 7:
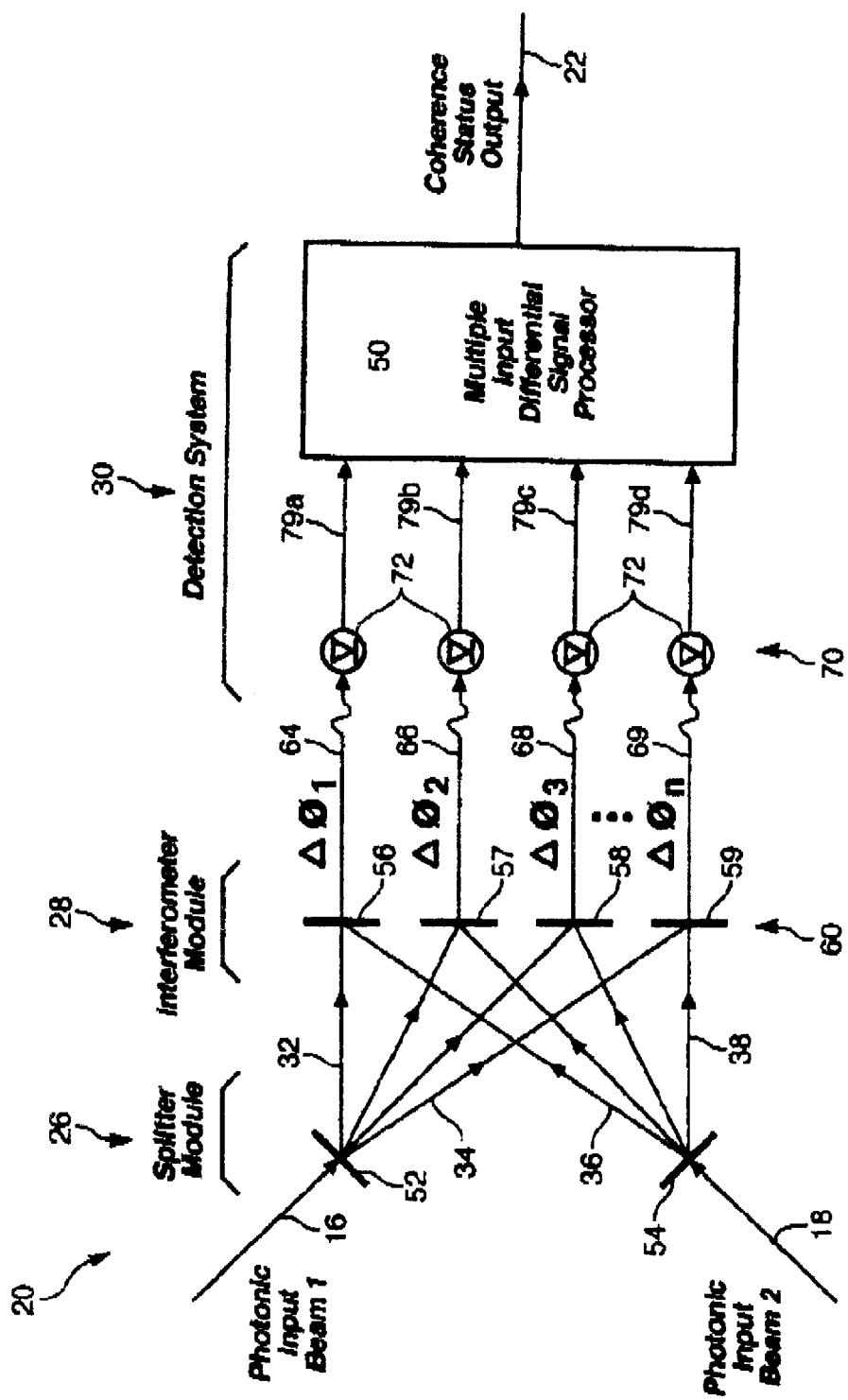
FIG. 7 is a schematic block diagram illustrating one alternative embodiment of a phase-compensated interferometer and detection system in accordance with the apparatus of the invention.

Referring to FIG. 7, a splitter module 26 may include splitters 52, 54 configured to receive the inputs 16, 18. The splitters 52, 54 direct signals 32, 34, and 36, 38 respectively toward the interferometer module 28. The interferometer 28 includes several interferometers 60. For example, the combiners 56, 58, 59 maybe selected from holograms, sub-hologram parts of a larger hologram, optical fibers, optical fiber combiners, partially reflecting mirrors, Young-type slit interferometers, and pinhole interferometers. The outputs of the interferometer module 28 result in variations in phase therebetween. This variation in the phases of the outputs 64, 66, 68, 69 results from the difference in path of the inputs 32, 34, 36, 38 into the various interferometers 60.

As a practical matter, a number of output lines 64, 66, 68, 69 may be arbitrarily selected according to some design criterion. However, the combination of all the outputs 64–69 up to some number "n" will span the entire cycle of 360 degrees. Accordingly, the combination of all the outputs 64–69 provide a granularity of "n" in an array spanning 360 degrees of phase difference. In other words, a phased array of outputs 64–69 spans 360 degrees of phase at a granularity of "n."

Each of the outputs 64, 66, 68, 69 is received into a detector 72 (e.g. photo detectors 70) capable of detecting wave-type energy. A multiple-input differential signal processor receives the outputs 79a, 79b, 79c, 79d from the detectors 70. The signal processor 50 executes the comparative analysis between the pairs 72 of detectors 70 in order to provide the output 22.

Figure 8:
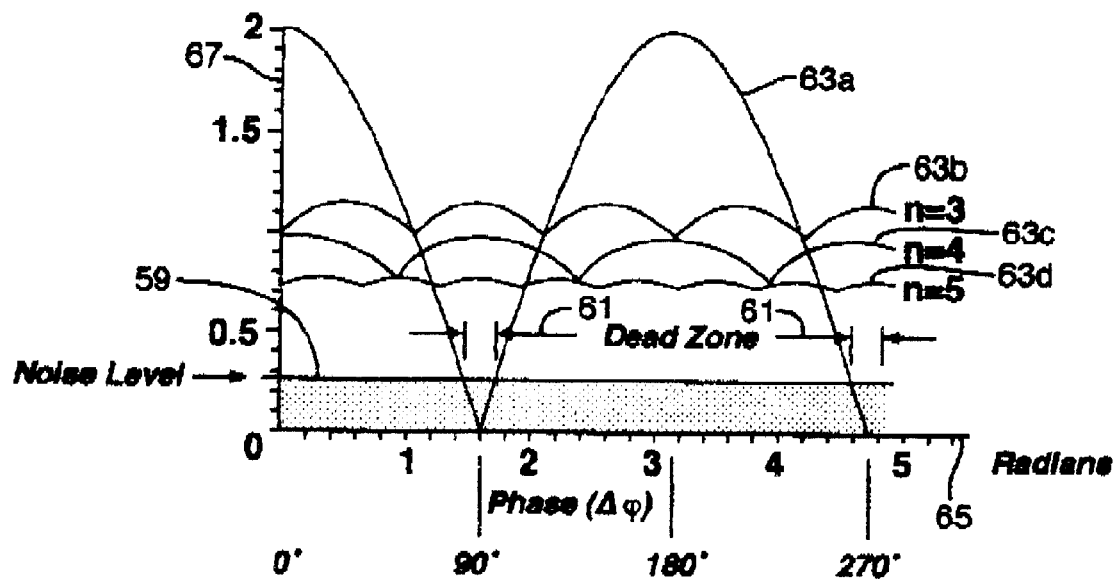
FIG. 8 is a graph illustrating differential outputs, and the variation thereof with multiple detectors in accordance with the invention.

Referring to FIG. 8, a zone 61 of indeterminacy exists in a graph 63 representing a differential output 22 resulting from the phase difference 65 between incoming signals 16, 18. Accordingly, the differential output value 67 reflects a variation in amplitude of the output signal 22 of the signal processor 50. As illustrated, different numbers of output signals 79 provide different curves or graphs 63a, 63b, 63c, 63d corresponding thereto. Each of the graphs 63 represents a different embodiment, where the number "n" represents the total number of output lines 79 defining phase granularity.

In an embodiment where n=2, the graph of 63a represents the amplitude variation in the differential output as a function of phase 65. Accordingly, a noise level 59 affects the dead zone width 61. That is, theoretically, a point of indeterminacy exists at 90 degrees of phase differential in an apparatus having two outputs 79. Accordingly, a single point of coherence indeterminacy would exist at the 90 degrees phase differential. However, because a noise level 59 truncates effectively the useable value of the output 67, the dead zone width 61 is effectively defined by the portion of the graph 63a that is below the noise level 59. The same dead zone width 61 exists at 270 degrees of phase differential.

By having three or more output paths 79, the value of the graphs 63b, 63c, 63d no longer falls below the noise level 59. Accordingly, an apparatus in accordance with the invention is both phase-insensitive and coherence determinate. Phase related fluctuations in the output value 67 will occur within each of the graphs 63. The value 67 of any graphs 63 does not decrease into the noise level 59. As the number of input lines 79 to the signal processor 50 increases (the number of elements in the phased array defining the granularity of the phased array) the fluctuations tend to stabilize with increased values of "n."

Figure 9:
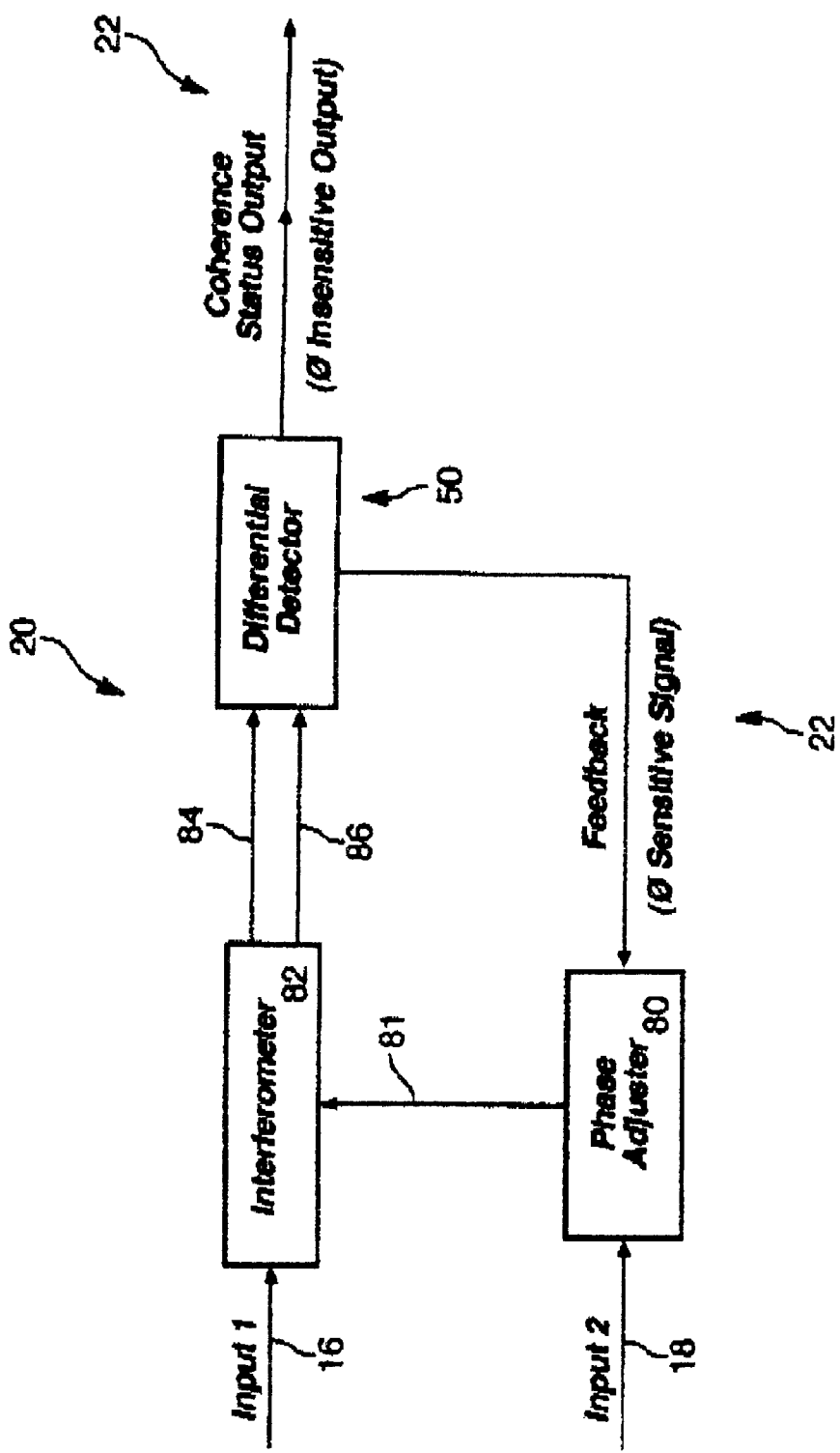
FIG. 9 is a schematic block diagram of one embodiment of a phase-adjusted interferometric system providing feedback from a differential detector to a phase adjuster.

Referring to FIG. 9, an alternative embodiment for an apparatus 10 may include elimination of indeterminacy by relying on a feedback control loop. For example, the interferometer 82 may receive an input 16 producing output signals 84, 86. The outputs 84, 86 become outputs to the differential detector 50. The output of the differential detector 50 is fed back to a phase adjuster 80. The phase adjuster 80 receives the input signal 18, making a phase adjustment prior to inputting the signal 18 as the signal 81 into the interferometer 82. The differential detector 50, by producing the output 22 along one of the graphs 63, identifies a change in value of the graph 63 approaching the noise level 59. Accordingly, the phase adjuster 80 can adjust the phase of the input 18, thus moving up the curve 63a away from any of the dead zone regions 61.

Although the apparatus 20 of FIG. 7 has a response time that substantially accommodates any incoming signal at an arbitrary rate, the embodiment of FIG. 9 need not respond so rapidly when expected phase fluctuations are limited to a lesser bandwidth. Great liberty may be taken in selecting a phase adjuster 80. For example, electrotechnical devices, servo-control mechanisms, pneumatic devices, apparatus to change indices of refraction, and the like all are sufficiently fast to provide the function of the phase adjuster 80. In certain embodiments, the phase adjuster 80 may be thought of as a phase modulator.

Figure 10:
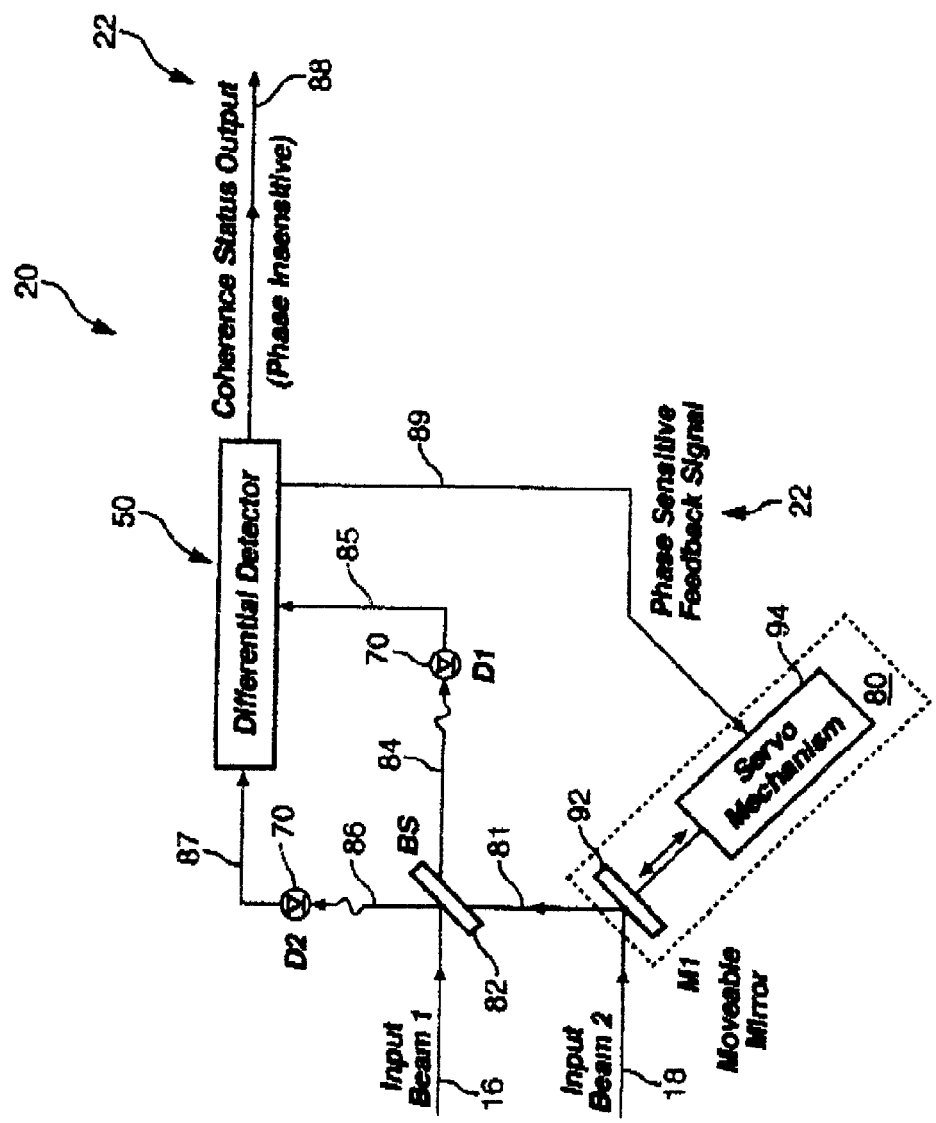
FIG. 10 is a schematic block diagram of an apparatus in accordance with FIG. 9, including a phase-sensitive signal provided to a servo mechanism to adjust a mirror and provide tracking and phase insensitivity.

Referring to FIG. 10, a detection system 20 may be configured to include a signal 16 coming directly to a splitter 82 (used as a combiner). Meanwhile, a second input 18 arrives along a path including a movable mirror 92, reflecting the signal 81 to the beam splitter 82. Accordingly, the two outputs 84, 86 from the beam splitter 82 pass through detectors 70, which forward the resulting outputs 85, 87 as inputs to the differential detector 50. Accordingly, the embodiment of FIG. 10 is one configuration for an apparatus of FIG. 9 to be implemented. In the apparatus of FIGS. 9–10, "n" has a value of 2.

Figure 11:
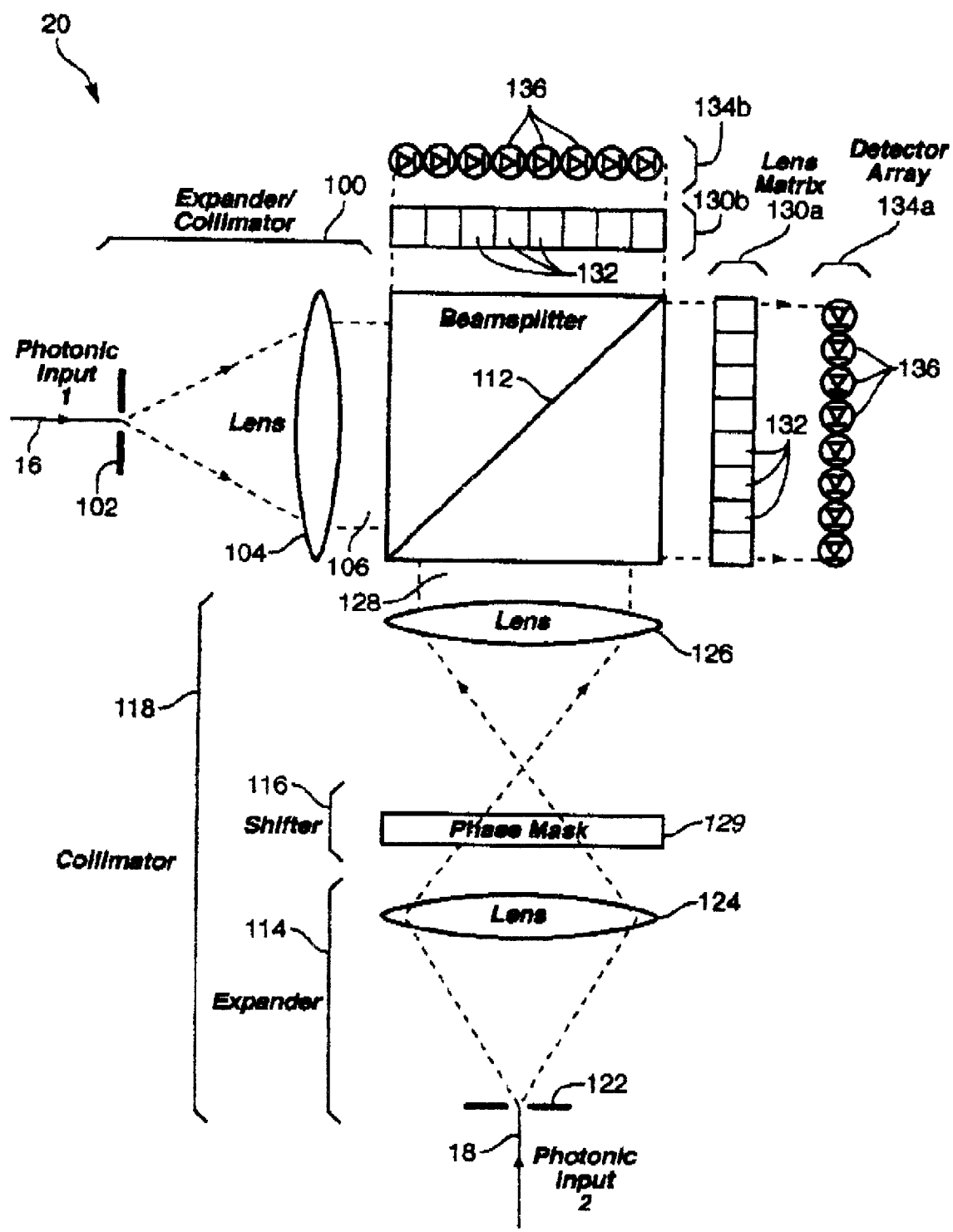
FIG. 11 is a schematic block diagram of one embodiment of an apparatus in which a double photonic inputs are collimated, one signal expanded and phase shifted, and the two signals made to interfere on a surface of a beam splitter, thus supporting signals fed to a detector array through a lens matrix.

Referring to FIG. 11, an embodiment of a detection system 20, the value of "n" may be much larger. For example, a photonics input 16 passes through an entry location 102 such as an end of a fiberoptic fiber, aperture, or the like. Accordingly, the signal 116 passes to a lens 104 to become a collimated beam 106 passing into the beam splitter 110. Accordingly, the beam 106 strikes the splitting surface 112. Photonic elements 102, 104, 122, 124 may also be made as a system as described hereinbelow with reference to FIG. 15.

The input beam 18 passes through a portal 122 entry point, such as the entry point 102, into a lens 124. The lens 24 acts as a projection lens with the aperture 122, while the phase mask 129 acts as a phase shifter 116, the image of which is projected toward a surface 112. Accordingly, the entire collimator 118 provides a collimated beam 128 based on the input signal 18. The phase mask 129 has the effect of imposing a phase distribution on the image projected toward the lens 126. The beams 106, 128 both impinge on the splitting surface 112. Accordingly, a portion of the beam 106 may pass through the surface 112 toward the lens array 130a. Similarly, a portion of the beam 106 may reflect from the splitting surface 112 toward the lens array 130b.

The beam 128 may partially pass through the splitting plane 112 toward the array 130b, while a reflected portion of the beam 128 is reflected from the surface 112 toward the array 130a. The beam 106 from the expander-collimator 100, and the beam 128 from the collimator 118 create wave interference at the splitter surface 112. The resulting complementary interference images into the lens matrix array 130a, 130b. The effect of each of the lenses 132 in the arrays 130 is to project energy onto the detectors 134, 136 from specific portions of the projected images of the interfering beams 106, 128.

As in the embodiment of FIG. 7, the phase mask 129 steps through several phase shifts. Accordingly, the beam 128 is actually made up of a distributed series of segments having altered, distinct phases with respect to one another. Accordingly, the images arriving at the lenses 132 are each phased differently from one another and, therefore, provide a different equivalent of each of the signals 64, 66, 68, 69. One example of this is shown in FIG. 7. Thus, each of the detectors 134, 136 receives a portion of the phase-arrayed image, unique to itself The uniqueness is associated with the constructive and destructive interference resulting from the interference at the surface 112, and distributed among the sub-portions created by the phase mask 129. Accordingly, a value of "n" in the apparatus in FIG. 11 may take on an arbitrary number selected by the design of the phase mask 129, and the arrays 130, 134, 136.

Figure 12:
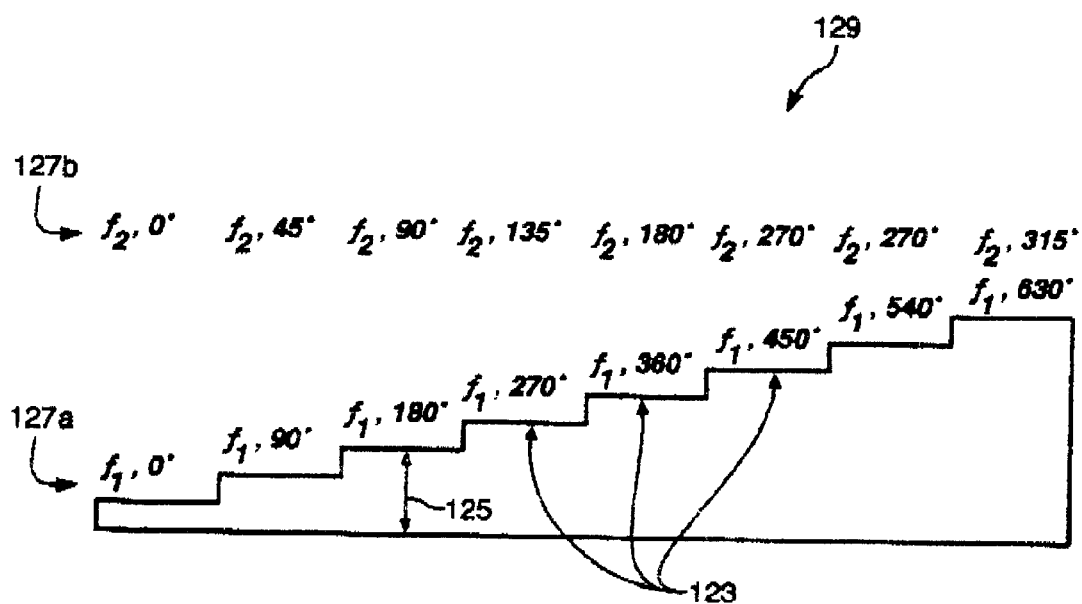
FIG. 12 is a schematic diagram of a broadband phase mask illustrating a stepped approach to providing multiple phase shifts.

Referring to FIG. 12, a phase mask 129 may include multiple steps 123, each having an associated distance 125. Accordingly, a given index of refraction associated with the mask 129 will provide a particular set of phase changes corresponding to the steps 123 for each frequency 127 of a beam passsed therethrough. Since various frequencies 12a, 127b represent different wave lengths, then the distance 125 associated with each step 123 represents a different phase depending upon which frequency 127 is passing through the mask 129. The number of steps 123 may be created to be equal to any suitable, feasible number of practical value.

Accordingly, the value "n" will match the number of lenses 132 in each of the arrays 13a, 130b. Similarly, the corresponding number of detectors 134, 136 will be made to match the lens arrays 130. The phase shift associated with each step 123 is dependent upon the frequency 127 of the impinging beam therethrough. The granularity, terms of the numbers of degrees of phase shift, associated with each step 123 will vary for every frequency 127. Thus, the entire mask 129 accommodates a different total number of degrees of phase shift from beginning to end, depending upon frequency 127.

The number of steps 123 maybe selected to be any arbitrary number for which an operating frequency 127 will result in elimination of the indeterminate zone 61 or dead zone 61. A mask 129 that provides a granularity of some value of "n", and a 360 degree total variation of phase, is desirable. However, accommodation of a full 360 degrees of phase change may actually be accomplished with less than 360 degrees of shift in the mask 129, due to the complementary nature of the constructing and destructive interference (CI and DI).

Each of the detectors 136 in the arrays 134a, 134b provides a complementary portion of an image. Accordingly, the number of steps 123 required in order to provide elimination of the indeterminate zone 61 or dead zone 61 is the number required to provide the designed number "n" greater than 2, as described in FIG. 8. Two detectors 136 in each of the arrays 134a, 134b provide for complementary outputs, and effectively replicate the performance of FIGS. 6 and 7. Thus, as described with respect to FIG. 7, any number "n" may be selected for design convenience, so long as the indeterminate zone 61 is eliminated. For example, the flatter curve 63 or graph 63 desired, the greater "n" may be. Also, the broader the bandwidth desired to be handled by the apparatus 20 (detection system 20) of FIG. 11, the greater the value of "n" should be. Thus, for broader bandwidth and more precise granularity (smaller subdivisions), additional steps 123 may be relied upon. However, the greater bandwidth does not adversely affect the resolution of the invention as such result is determined by the choice of reference signal, making the invention an active, dynamic filter.

Figure 13:
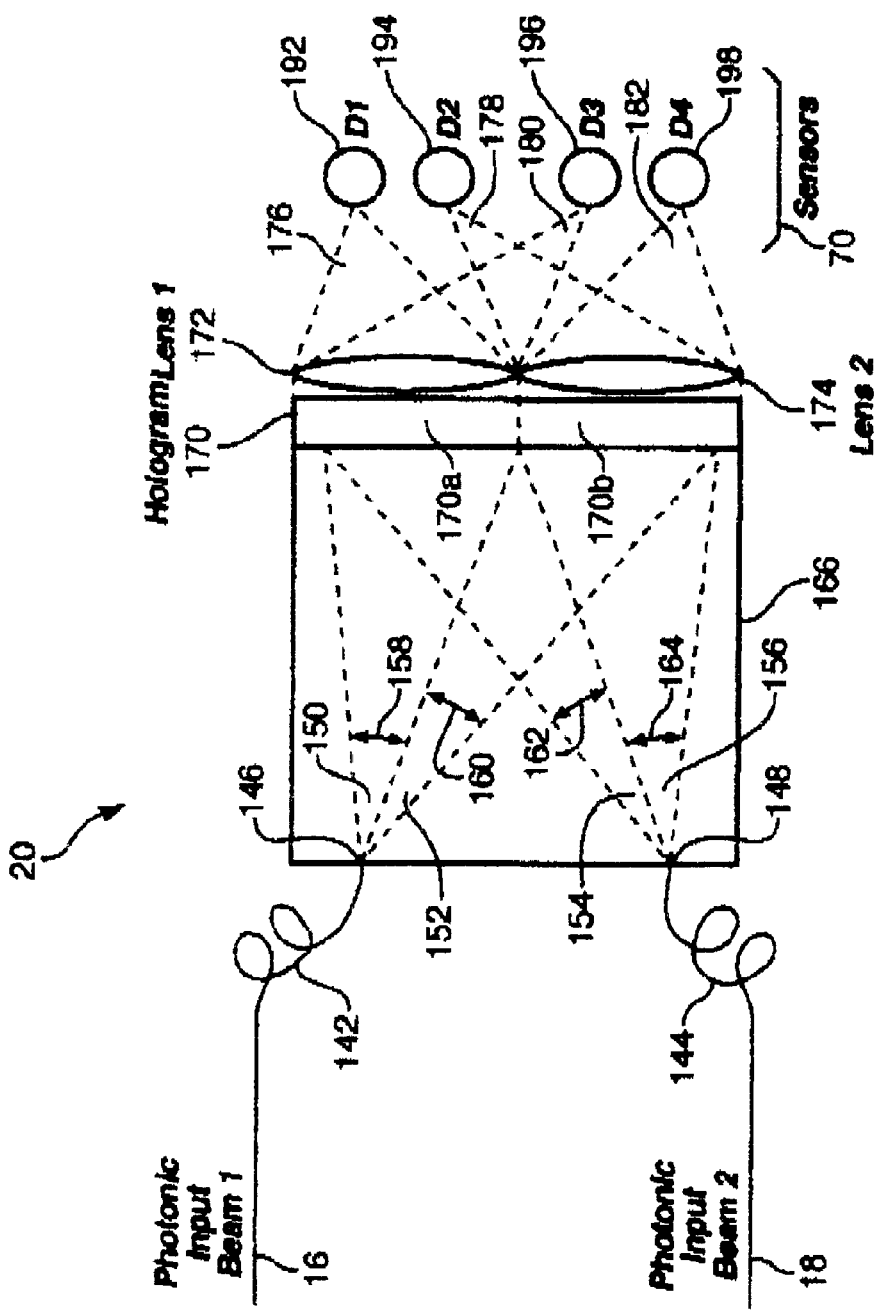
FIG. 13 is a schematic diagram illustrating a method and apparatus for processing holographic images in in situ in order to maintain alignments with respect to incoming signal sources and apertures.
Figure 14:
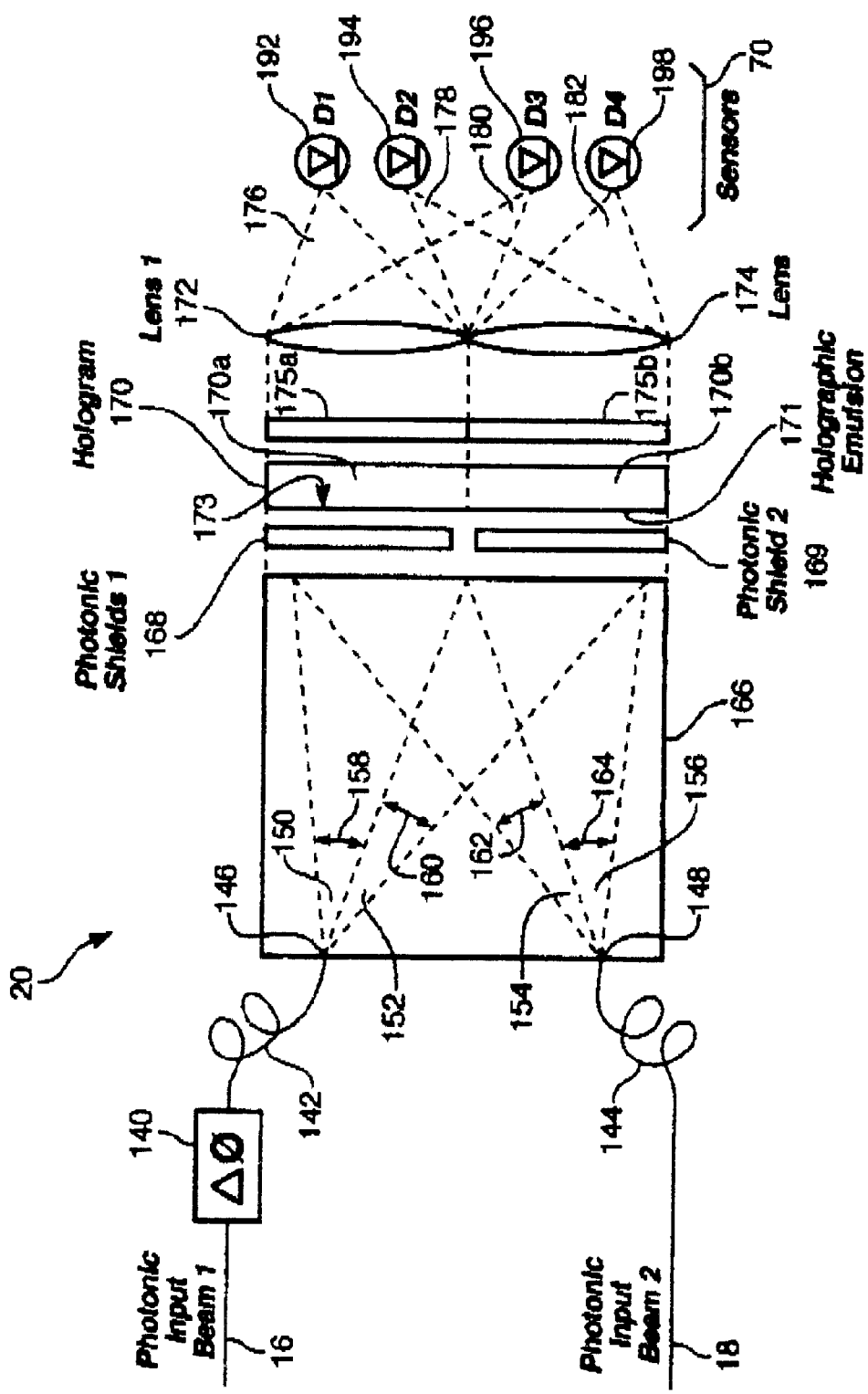
FIG. 14 is a schematic diagram illustrated one method for exposing holographic materials for use as holograms or lenses.

Referring to FIGS. 13–14, a holographic embodiment of a detection system 20 is illustrated by FIG. 13, and additional components in a manufacturing process therefor are illustrated in FIG. 14. In operation, two inputs 16, 18 pass through respective optical fibers 142, 144 or other carrier media 142, 144, to be emitted through respective apertures 146, 148. From the aperture 146 are emitted the portions 150, 152 or beams 150, 152. Similarly, from the aperture 148 are emitted the beam portions 154, 156. Each of the beam portions 150, 152 subtends a respective angle 158, 160. Similarly, each of the beam portions 154, 156 subtends an angle 162, 164, respectively. The beams 150, 152 and 154, 156 impinge on a hologram 170. The angles 158, 160, and 162, 164 are determined by the subdivision of the hologram 170 into sub-hologram portions 170a, 170b.

In operation, the energy passing from the apertures 146, 148 and through the hologram 170 may be passed through lenses 172, 174 toward sensors 70. The lenses 172, 174 focus the beams 176, 178, 180, 182 onto the individual detectors 192, 194, 196, 198, respectively.

In operation, the frame 166 or mount 166 fixes the apertures 146, 148 with respect to the sub-holograms 170a, 170b. Thus, the beam portion 150 and the beam portion 154 impinge on the sub-hologram 170a to produce interference under the proper conditions. When the beam portions 150, 154 are coherent, interference will occur in the hologram 170. Coherence may exist in any of the domains identified above (see FIG. 3).

To the extent that constructive interference exists, complementary destructive interference will also exist. Accordingly, when the beam 176 provides constructive interference to the detector 192, the beam 180 may provide destructive interference to the detector 196. In conditions where coherence is lacking, the sub-hologram portion 170a acts merely as a beam splitter. Accordingly, the sensors 192, 196 will not have radically differentiable inputs.

Alternatively, with coherent beam portions 150, 154, constructive interference may exist in the beam 180, with destructive interference in the beam 176. Other conditions, as described hereinabove may provide similarly. The beam portions 152, 164 may impinge on the sub-hologram 170b to produce constructive and destructive interference in complementary outputs 178, 182 impinging on the detectors 194, 198. As with the other phased arrays, the sensors 70 as a suite 70 represent a phased array. The full set of sensors 192, 194, 196, 198, together, provide a full 360 degrees of coverage as in the conditions of FIG. 8. In this case, the value of "n" is 4. Thus, the presence of constructive and destructive interference, the complementary condition of destructive and constructive interference in the same sensors, and other conditions in which little or no differential exists between any matched set of sensors 192, 196, or 194, 198, respectively, may all exist in the apparatus 20 of FIG. 13, as in previously described embodiments of a detection system 20.

Referring to FIG. 14, an exploded view of the detection system 20 illustrates the manufacturing methods and materials schematically for constructing the apparatus in FIG. 13. In an initial stage of manufacture, a hologram 170 or more properly a hologram substrate 170 is mounted to the frame 166 with an emulsion 171 prepared on a surface 173 thereon. Initially, a mask 169 may be positioned to protect the emulsion 171 over the sub-hologram portion 170b. Both input beams 16, 18 are activated to illuminate or expose the emulsion 171 associated with the sub-hologram 170a. The photonic shield 168 may be removed as a shutter, or may be removed before the input beams 16, 18 are activated. As a practical matter, if the shield 168 is in close proximity of the hologram 170, then motion of the shield 168 may be improper.

Upon activation of the inputs 16, 18, the beam portions 150 and 154 are directed to the sub-hologram 170a producing an interference pattern on the holographic emulsion 171. Following exposure of the holographic emulsion 171, the beams 16, 18 are shut off, or otherwise deactivated. Meanwhile, in one presently preferred embodiment, the shield 168 is replaced or installed in front of the sub-hologram 170a and the shield 169 is removed from protecting the sub-hologram 170b with it's associated portion of the holographic emulsion 171.

Next, the phase shifter 140 is adjusted to shift the phase of the incoming beam 16 that will shortly appear by 90 degrees. Again, the beam 16 and the beam 18 are activated producing the beam portions 152, 156 impinging on the holographic emulsion 171 associated with the sub-hologram 170b. The sub-portions 152, 156 produce all interference pattern on the holographic emulsion 171 associated with the sub-hologram 170b. The input beams 16,18 are then shut off or otherwise deactivated.

Development of the holographic emulsion 171 may be accomplished in multiple ways. In one embodiment of a method, the entire frame 166 and hologram 170 are immersed in a development fluid to develop the holographic emulsion 171. This approach has an advantage of maintaining virtually perfect registration of the hologram 170, the frame 166, and the apertures 146, 148, with respect to one another. Thus, the wavefronts associated with each of the beams 150, 152, 154, 156 are maintained in substantially identical registration.

Alternatively, the hologram 170 may be secured initially to the frame 166 to provide a precise registration therewith. Thereafter, exposure of the holographic emulsion 171 may proceed in the registration position. Then the hologram 170 may be removed and developed, to be subsequently placed back in the exact registration position with respect to the frame 166.

The resulting apparatus 20 provides a precisely registered pair of interferometers 170a, 170b stabilized with respect to each other and with respect to the light sources at the apertures 146, 148. The two interferometers 170a, 170b function out of phase with one another by 90 degrees. Accordingly, the detectors 70 (e.g. detectors 192, 194, 196, 198) are provided with the same energy contributions or distributions as the sensors 70 in the apparatus of FIG. 6.

Figure 15:
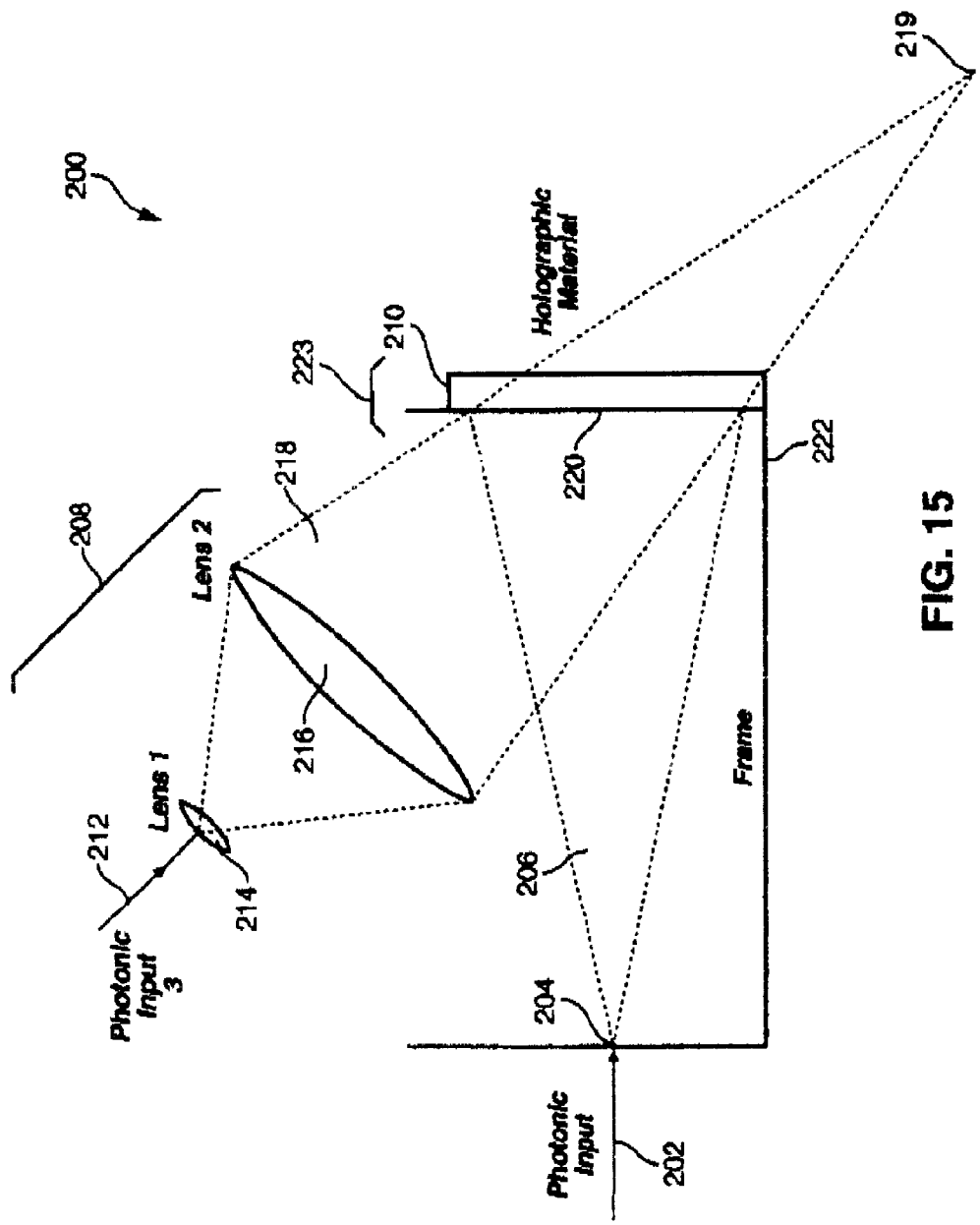
FIG. 15 illustrates a schematic diagram of one method for exposing holographic emulsions to form holograms.

Referring to FIG. 15, a method similar to that used for fabricating holographic detections systems 20 as described with respect to FIGS. 13–14 may be used to provide holographic lenses. The apparatus 200 provides a process for making the lenses 172, 174 holographically.

An input 202 (equivalent to or identical to one of the inputs 16, 18) is provided through an aperture 204 that is substantially equivalent or identical to either of the apertures 146, 148. The photonic input 202 provides an expanded wavefront 206. Meanwhile, an optical system 208 may include a focusing system 208 which cooperates with the aperture 204 to create a hologram on the surface 220 of a holographic substrate 210. A photonic input 212, coherent with the photonic input 202 is directed through a lens 214 to form an expanding wavefront directed toward another lens 216. The lens 216 is a focusing lens and focuses a beam 218 on a focal point 219 on an opposite side of the holographic surface 220. An interference pattern is produced on the surface 220 exposing the emulsion 220 to the interference pattern produced by the coherent wavefronts 206, 218.

Prior to manufacture, the holographic material 210 or substrate 210 is registered and mounted with respect to the optical frame 222. Similarly, the aperture 204 is registered with respect to the frame 222. Thus, the substrate 210 may be removed, and the emulsion surface 220 developed to form a hologram having to be replaced in exactly the same registration with respect to the optical frame 222. Two apertures 204 corresponding to the apertures 146, 148 are used to execute the forgoing process twice. In each instance, the emulsion 220 is either masked or not yet present on the substrate 210 for a side not involved. Thus, the resulting hologram 223 forms a pair of holographic lenses 172, 174.

Figure 16:
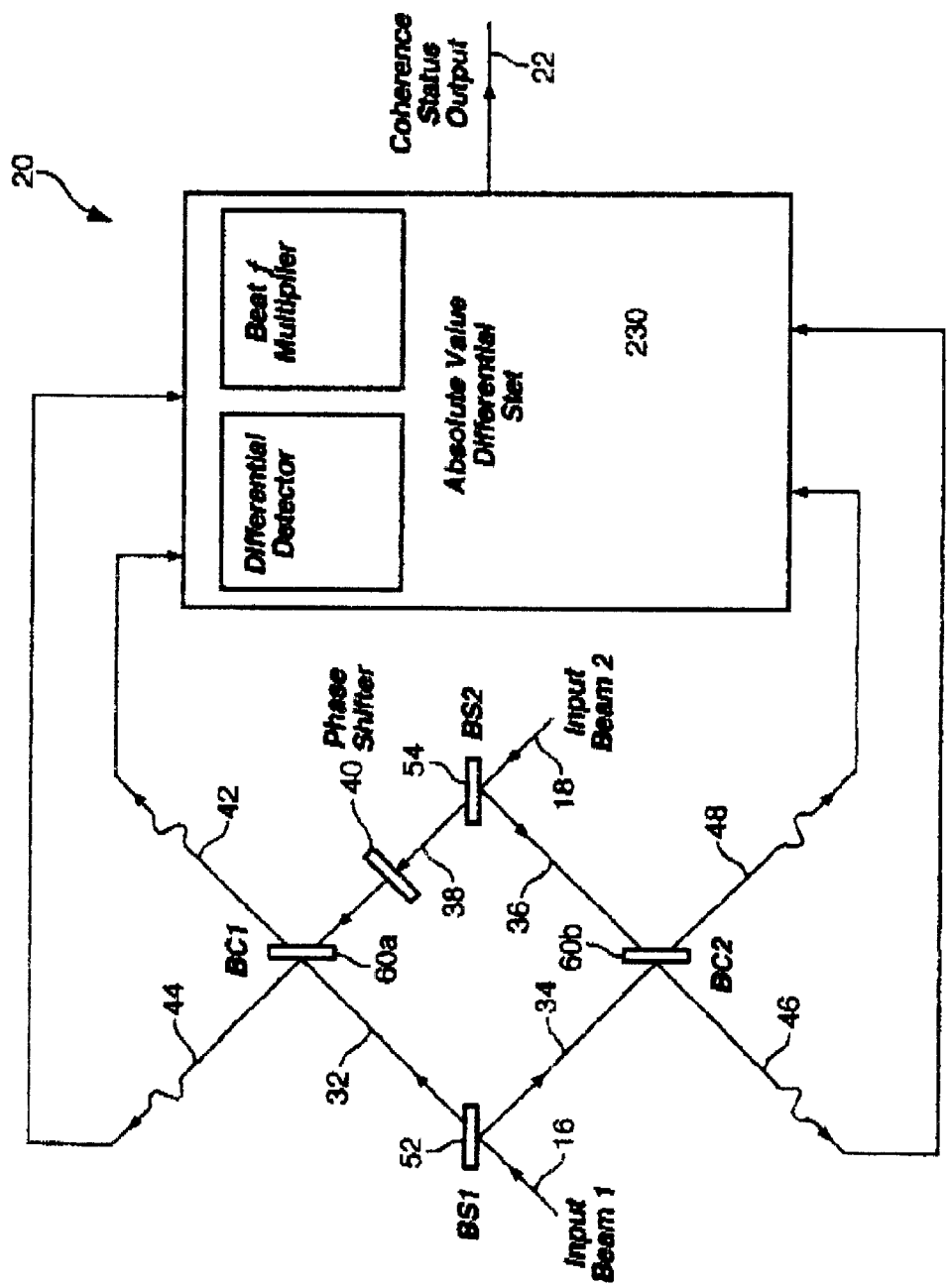
FIG. 16 is a schematic block diagram illustrating a circuit of sensors in conjunction with an absolute value differential detector for providing a coherence status output.

Referring to FIG. 16, an absolute value differential detector 230 incorporates both detectors 70, and a signal processor 230 (absolute value differential processor 74). Accordingly, the signals 42, 44, 46, 48 are passed from the interferometers 60 to the absolute value differential detectors 230. Each of the detector systems 230a, 230b of FIGS. 17–18 is an alternative embodiment for the contents of the absolute value differential detector 230 of FIG. 16.

Figure 17:
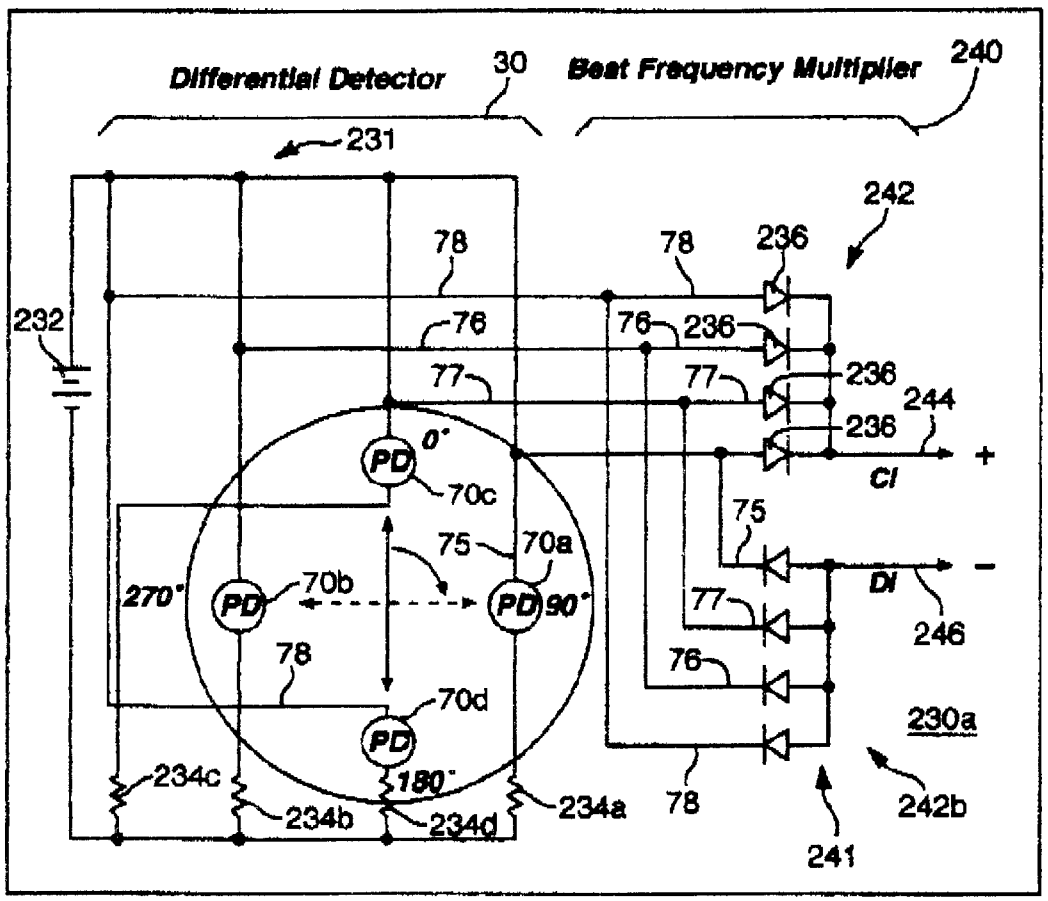
FIG. 17 is a schematic block diagram of one alternative embodiment for parallel processing of signals from a detector in accordance with the invention.
Figure 18:
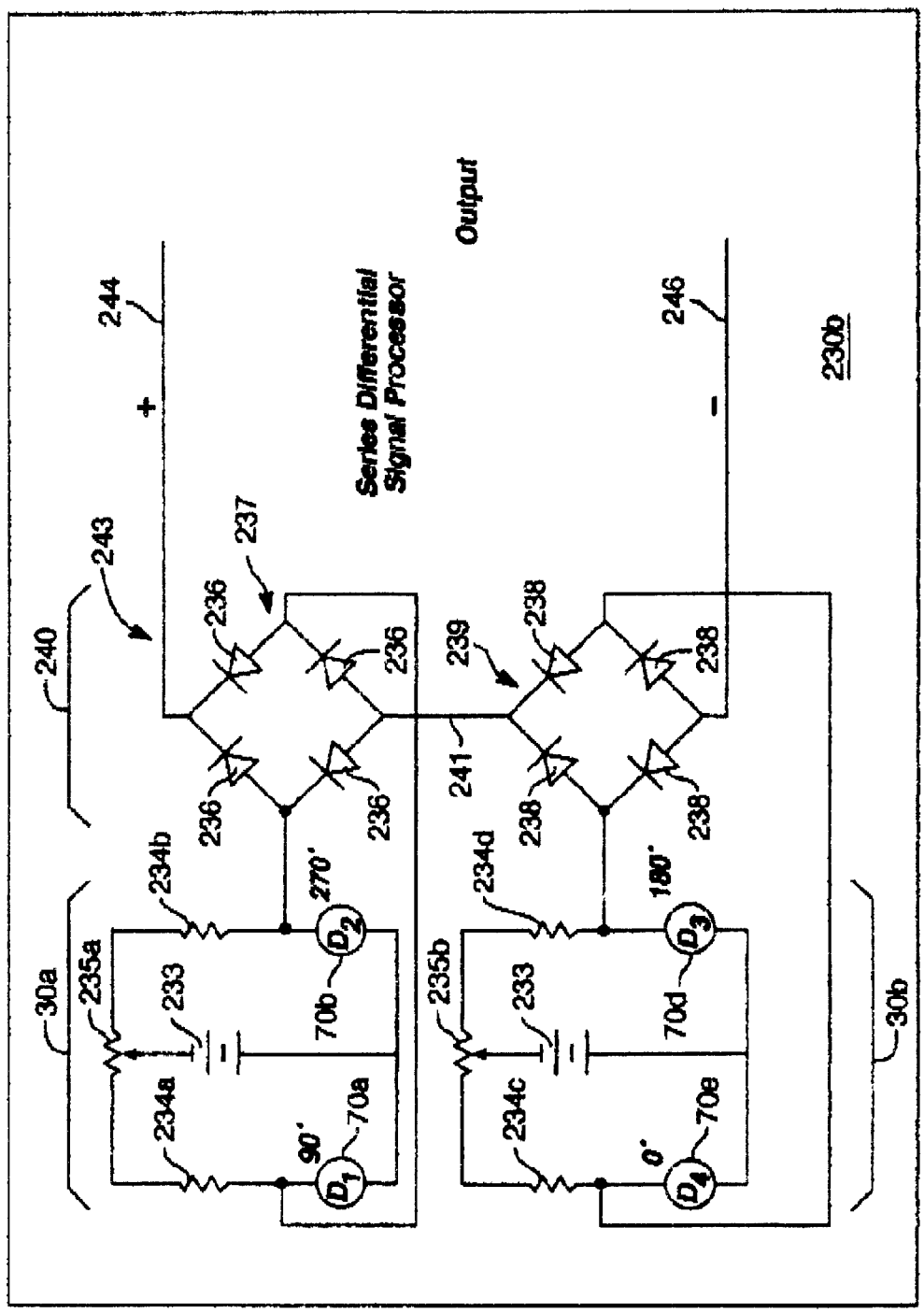
FIG. 18 is a schematic block diagram of a series differential signal processor for connection with a sensor suite in accordance with the invention.

Although each of the devices 230a, 230b include both a differential detector 30, and a beat frequency multiplier 240, the apparatus of FIG. 17 includes a parallel beat-frequency multiplier 241, while the apparatus 230b of FIG. 18 includes a series beat-frequency multiplier 243 or series differential signal processor 243.

Referring to FIG. 17, several detectors 70 may be arranged in accordance with the architecture of FIG. 16. Accordingly, each detector 70a, 70b, 70c, 70d is shifted in phase photonically due to the combination of photonic elements 52, 54, 60. In considering the operation of detector 70c and the detector 70d, a phase difference of 180 degrees exists therebetween if coherence exists. A presence of coherence causes constructive interference to appear at the detector 70c, and destructive interference to appear at the detector 70d. Since the energy content or brightness of the detector 70c is substantially greater than that of detector 70d, a differential exists between them. Therefore, the detector 70c conducts more, and the detector 70d conducts less.

The detectors 70 are connected to a floating power supply 231 including a battery 232 and various resistors 234, a voltage develops between the signal line 77 corresponding to the detector 70c, and the signal line 78, corresponding to the detector 70d when the inputs 16 and 18 are in phase or counterphase. The diodes 236 and 238 in the arrays 242a, 242b form a bridge circuit.

In the case of constructive interference at the detector 70c, the signal on the line 77 goes high or positive, while the signal on the line 78 goes low or negative. This combination produces a difference between the output lines 244, 246, indicating the presence of constructive interference and destructive interference. The inputs to the detectors 70c, 70d are the complementary outputs 46, 48 from the common interferometer 60b.

Because of the phase shifter 40 creating a 90 degree shift in phase, the output signals 42, 44 from the interferometer 60a, common to the detectors 70a, 70b, provide a differential output therebetween whenever the phase difference between the input beams 16, 18 is approximately 90 degrees, or 270 degrees. With respect to FIG. 8, adding the interferometer 60a, and producing the signals 42, 44 with their relationship, eliminates indeterminacy, the indeterminate zone 61. Otherwise, if only the interferometer 60b existed, then the value of "n" would equal 2, producing the graph 63a as the value 67 of FIG. 8.

When the energy received through the input beam 16, 18 is not coherent, constructive and destructive interference will not be present. Accordingly, the distribution of energy follows rules of photonics or optics, as appropriate, and is simply divided approximately equal among the various detectors 70. Variations due to the particular arrangement may be somewhat less that exact quality, but the large differentials attributable to constructive and destructive interference do not exist. Accordingly, under such a condition, the voltages on each of the output lines 75, 76, 77, 78 are approximately equal. Therefore, no voltage is developed between the outputs 244, 246, and no effective output is produced. In a circumstance where a detector 230 (absolute value detector 230) is used to match a photonic fingerprint waveform 21 (see FIG. 3) presented simultaneously to the input lines 16, 18, and being substantially phase-stable, then the data representing the waveform 21 appears as the outputs 244, 246. This is the condition that might exist in a coherent detection system for a telecommunication receiver.

When comparing waveforms 21 and under circumstances where a fingerprint match exists, at the same frequency, no beat frequency exists between the outputs of the detectors 70. That is, since all are operating at the same frequency, no difference in frequency exists, so no "beat frequency" is experienced by the system 230. Therefore, a beat-frequency multiplier 240 is multiplying a zero value signal by the value of the waveform 21. The result is an output 244, 246, which is the output of the waveform 21, without any multiplication of frequencies. That is, the beat-frequency multiplier 240, multiplying a zero value, does not alter the inherent frequency of the waveform 21.

Another condition of interest for the inputs 16, 18 is a circumstance in which multiple waveforms 21 differ somewhat in frequency between the input lines 16, 18. In such a condition, a "beat frequency" exists.

In a condition of a beat frequency condition, a signal received becomes periodically weaker and stronger. When two signals of different frequencies are superposed, the combination undergoes a continuous variation in the phase in accordance with the difference between their frequencies. This periodicity is the beat frequency. Interference is a redistribution of energy that occurs when the two wave are superposed. Since the superposition of two waves having different frequencies results in an interference process, that interference process changes the spacial redistribution of energy in accordance with the beat-frequency.

The maximum energy value of constructive interference is sequentially distributed among the detectors 70 in accordance with a pattern. That pattern distributes the constructive interference energy first to the detector 70c, then the to the detector 70a, because of the 90 degree phase difference therebetween. Subsequently, the energy is distributed to the detector 70b, and then distributed to the detector 70b. Again, the difference in phase between the detector 70a and 70d is 90 degrees, and the difference in phase between the detector 70d and the detector 70b is another 90 degrees. Thereafter, the distribution of energy again falls to the detector 70c.

Alternatively, the energy may be distributed in the reverse order for the same reason. As a result, the value of the voltage output by the output lines 244, 246 moves between a series of maxima. The number of maxima received at the outputs 244, 246 is the number "n" of detectors 70 multiplied by the beat frequency. For every cycle of the beat frequency, the energy is sequentially distributed among all "n" of the detectors 70. This produces the sequence of maxima of outputs 244, 246. Thus, the apparatus 230 may be thought of as a beat-frequency multiplier. More correctly the portion 240 of the apparatus 230 becomes a beat-frequency multiplier.

The beat-frequency phenomenon that occurs in photonic systems occurs as a direct result of interference phenomena. Interference causes the differential between constructive interference and destructive interference to exist. Accordingly, the continuous phase difference is translated by interference into a continuous variation and amplitude at each of the locations corresponding to the detectors 70. Thus, a spacial redistribution of the energy, which must be conserved, has occurred. Moreover, the distribution is spatially sequential with time.

Referring to FIG. 18, a signal processor 230b operates in series, in a manner similar to that of the signal processor 230a of FIG. 17, which operates in parallel. The system associated with the interferometer 60a, has associated complementary outputs 42, 44. Corresponding detectors 70a, 70b are connected in parallel with the interferometer 60b, its associated complementary outputs 46, 48, and corresponding detectors 70c, 70d. Thus, the electronics associated with the interferometer 60a, and subsequent processing of the complementary signals 42, 44, operate in parallel with the system associated with the interferometer 60b, and it's complementary signals 46, 48, and there subsequent processing. As a direct result of the parallel arrangement, the output 22, or as illustrated in FIG. 17, the voltage differential between the outputs 242, 246, will equal the voltage corresponding to the greater of the voltages associated with the interferometer 60a, or the interferometer 60b.

Referring to FIG. 18, in contrast to the forgoing, the output voltages associated with the interferometer 60a are connected in series with those of the system associated with the interferometer 60b. Accordingly, the net voltage created by the output 22, or as represented by the differential between the output lines 244, 246 (see FIG. 18) has a value equal to the maximum differential available between any of the signals 75, 76, 77, 78.

Referring to FIG. 18, a series differential signal processor 230b may include a differential detector 30 and may include detectors 70a, 70b, 70c, 70d connected to signal development resistors 234a, 234b, 234c, 234d. Meanwhile, balancing resisters 235a, 235b develop the proper balance with the corresponding circuits. Each of the batteries 233, represents a floating power supply 233 with respect to the outputs 244, 246. The balance detector 30a provides inputs to the diodes 236 forming the bridge circuit 237, while the differential detector 30b provided inputs to the diodes 238 of the bridge circuit 239. The bridge circuits 237, 239 form a signal processor 240. The bridge circuits 237, 239 are connected by the line 241, thus creating a series connection providing the voltage differential between the outputs 244, 246.

The absolute value differential detector 230 as illustrated in FIGS. 17–18, may also include beat-frequency multipliers 240. Beat-frequency multiplication provides a new mechanism for filtering.

Figure 19:
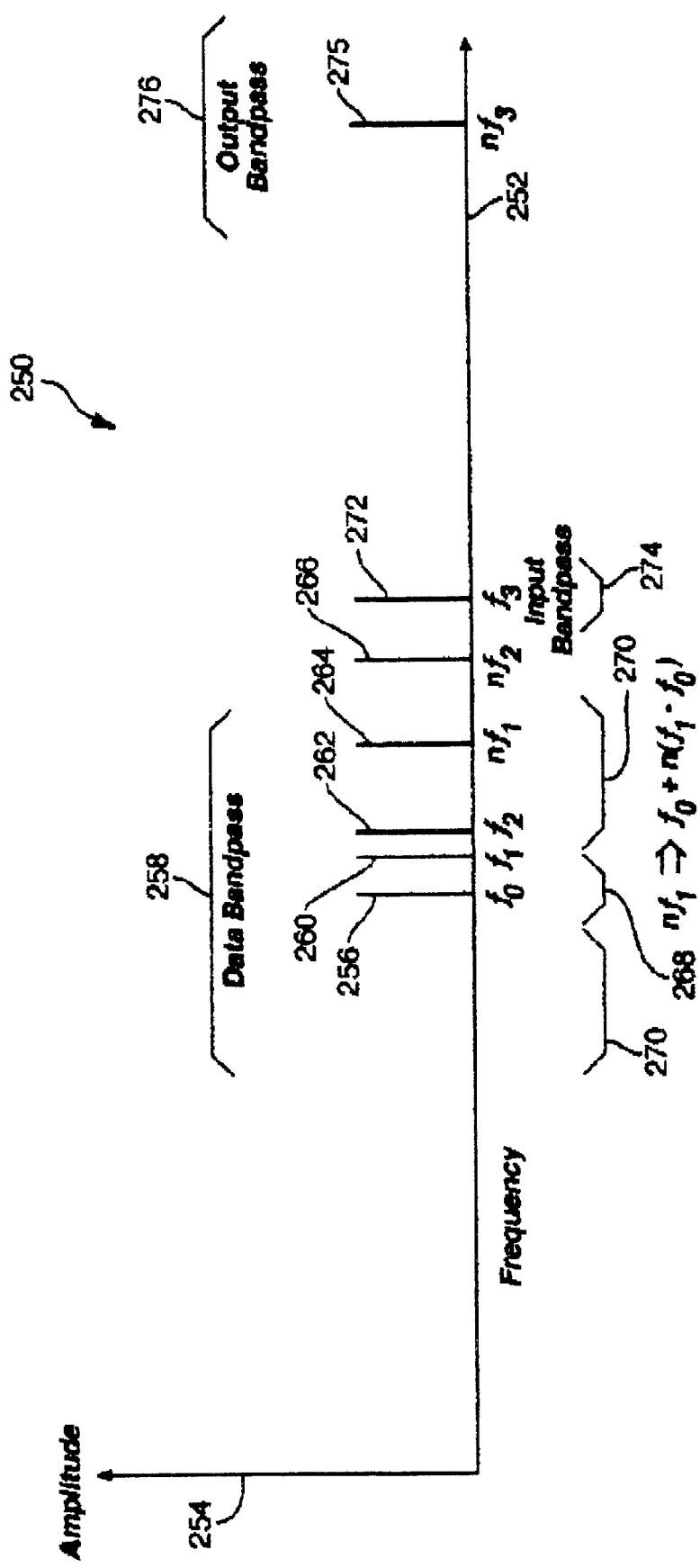
FIG. 19 is a schematic block diagram of a frequency distribution of signals and multiples of signals in accordance with certain aspects of the invention.

Referring to FIG. 19, a graph 250 illustrates the principals of beat-frequency multiplication. In general, two input signals 16, 18 may be identical, may be different, or may be intended to be identical but are different. Accordingly, one of the signals 16, 18 may be thought of as a reference signal. In the graph 250, a domain of frequency 252, having a range of amplitudes 254, may include a reference frequency 256 of reference signal 256. The reference signal 256 corresponds to one of the signals 16, 18 (whichever is picked as the reference).

Whichever signal 16, 18 is not selected as a reference signal is, for the sake of discussion, referred to as the input signal 16. Accordingly, the compared signal that would be compared to a reference signal 16, will be discussed as the compared signal 18. Nevertheless, either the signal 16, 18 maybe a reference signal, and the other signal 18, 16 maybe a compared signal.

When a compared signal 18 arrives and has the same frequency 256 as the reference signal 16, then the beat-frequency therebetween has a value of zero. In a condition, such as this, wherein the reference signal 16, and the compared signal 18 are at exactly the same frequency, a beat-frequency multiplier 240, in any embodiment provides no change to the waveform 21 at the outputs 244, 246.

In one embodiment, an apparatus and method in accordance to the invention may connect to a downstream device having a bandpass 258, representing a range of frequencies 252 of operation. Such a bandpass 258 may be referred to as a "data bandpass" when the data has been impressed upon the compared signal 18. A benefit and purpose of a beat-frequency multiplier 240 is to provide an improved signal to-noise ratio (SNR) and improved selectivity and resolution. Considering that a carrying frequency 256 corresponding to a compared signal 18 is the desired signal containing the desired information, additional signals 260, 262 (at frequencies 260, 262) may be considered to be noise. Due to beat-frequency multiplication, the difference between the noise signal 260 and the frequency 256 corresponding to the reference signal 16 is multiplied to provide a multiplied noise signal 264, which may yet remain within the data bandpass 258.

Meanwhile, the noise signal 262, also having a beat-frequency, and a difference in frequency with respect to the reference frequency 256, has that frequency multiplied to produce the frequency 256 further off set from the reference frequency 256. In this case, the frequency 266 lies outside the data bandpass 258. Thus, a desired input signal exists at the frequency 256, and noise input signals exist at the frequencies 260, 262. Output signals corresponding thereto exist at the frequency 256, the frequency 264, and the frequency 266. Accordingly, the overall noise is reduced because the multiplied signal 266 lies outside the data bandpass 258, thus improving the signal-to-noise ratio provided by the invention. Because the band spread between signals is multiplied, the selectivity of the invention is multiplied.

The adjacent frequency bandpass 268 includes the reference frequency 256, and the example frequency 260, as inputs into the apparatus of the invention. The adjacent frequency bandpass 268 is thus expanded to become the data bandpass 258. As a result, the apparatus 10 in accordance with the invention provides recovered bandpass 270, flanking the original adjacent frequency bandpass 268. The bandpass 270 is recovered by virtue of the fact that other signals within the bandpass 270 are multiplied (expanded) to provide outputs lying outside the data bandpass 258. One may refer to the recovered bandpass 270 as "recovered", by virtue of the fact that additional wave-division multiplexed signals may be placed within the frequency band 270, without improper cross-talk with signals at the frequency 256. Similarly, a frequency 272 may correspond to an input bandpass 274. The input bandpass 274 may be a frequency multiplied and expanded to become the output bandpass 276. This provides hyper-heterodyning having an expanded bandspread, greater selectivity and resolution. Such a scheme has been tested, having an AM radio wide resolution, even in the multi-terahertz optical bands.

Figure 20:
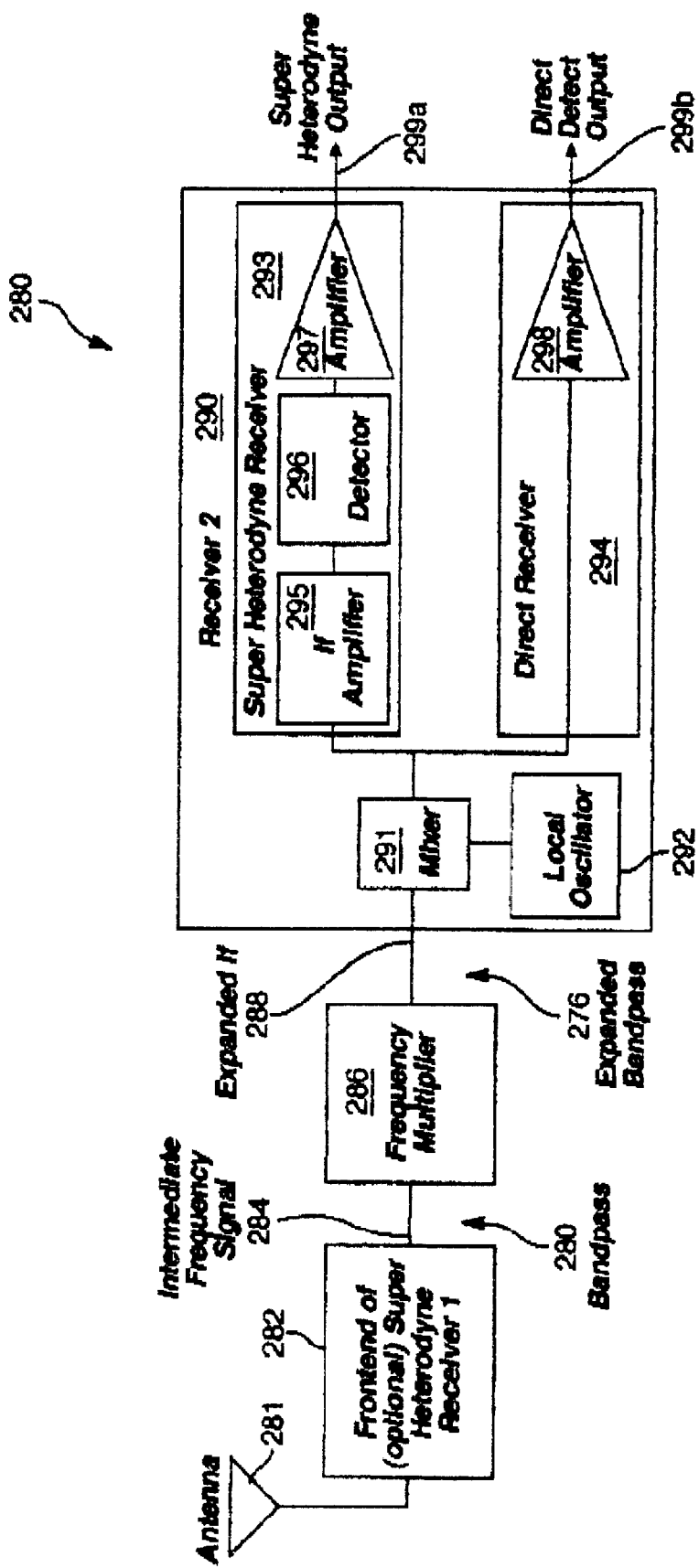
FIG. 20 is a schematic block diagram of an alterative embodiment of a frequency multiplier and receiver in accordance with the invention.

Referring to FIG. 20, photons of comparatively smaller wavelengths are handled as described hereinbefore. Energy in photons having comparatively longer wavelengths may be processed electronically. For example, in an apparatus 280 in accordance with the invention, an antenna 281 converts a photonic signal having a waveform 21 into an electronic signal corresponding to waveform 21. The waveform 21 may be received by an optional receiver 282, which may be a front end of a superheterodyne receiver 282. The receiver 282 provides an intermediate frequency signal 284 lying within the input bandpass 274 A frequency multiplier 286, which may be made in accordance with the invention or by any conventional means, provides beat-frequency multiplication as required by this aspect of the invention. The output 288 of the frequency multiplier 286 lies within the expanded bandpass 276 or output bandpass 276.

A receiver 290 receives the signal 288, and is able to tune across the expanded bandpass 276 providing increased resolution and selectivity within the second receiver 290. The receiver 290 may be of any suitable type, including several conventional types. In certain embodiments, the receiver 290 may include a super-heterodyne receiver 293, or alternatively, a direct detection receiver 294. For example, upon receipt of a signal from a mixer 291 incorporating both the signal 288 and the signal of a local oscillator 292, one of the receivers 293, 294 (Only one is used at a time, and thus this illustration shows two optional configurations, and not parallel circuits.) can produce a suitable output 299a, 299b, respectively. A super-heterodyne receiver 293 may typically include an intermediate frequency amplifier 295, followed by a detector 296. The signal is then amplified through an amplifier 297 providing a superheterodyne output 299a. Similarly, a signal received from the mixer 291 and passed to the receiver 294 passes through an amplifier 298 to provide a direct detection output 299b. Not only does the expanded bandpass 276 provide greater selectivity and resolution, it also provides an improved signal-to-noise ratio (SNR) for the reasons articulated previously, producing a hyper-heterodyne receiver.

Figure 21:
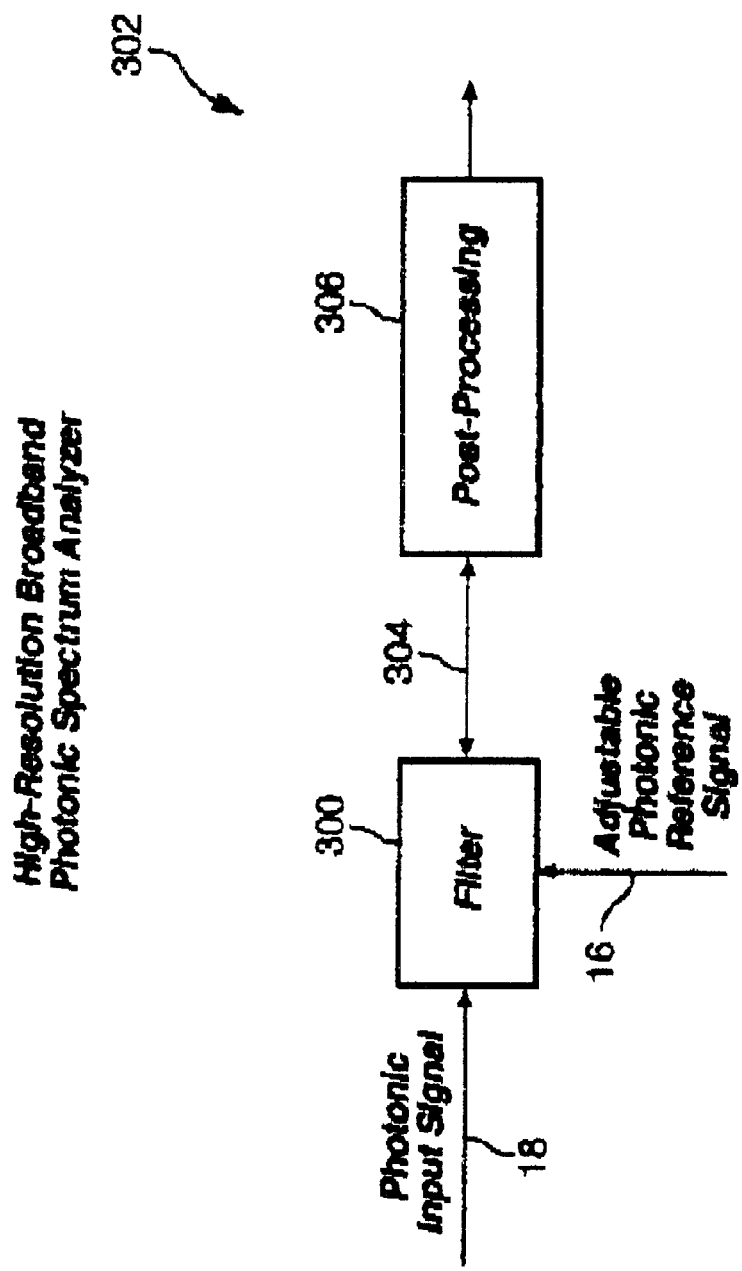
FIG. 21 is a schematic block diagram of one alternative embodiment to a high-resolution broadband photonic spectrum analyzer.

Referring to FIG. 21, inputs 16, 18 maybe received by a filter 300 in accordance with the invention and an apparatus 302 configured for ultra-high resolution, or hyper-resolution, broadband photonic spectrum analysis. Either of the inputs 16, 18 may be the adjustable photonic reference signal 16, or the photonic input signal 18 to be compared therewith. An embodiment of a filter 300 may comprise any of the phase-compensated, interferometer, and detection systems 20 discussed previously herein.

Because of the configuration and construction of the interferometer and detection system 20, the filter 300 provides a coherence-bandpass filter capacity. The apparatus 302 provides adjustability of the reference signal 16 in order to provide a dynamically adjustable filter 300. Thus, the output signal 304 from the filter 300 may be processed in a post processing signal processor 306. This is implemented in order to output a histogram or other representation of the response of the output signal 304 to the sweep of the adjustable photonic reference signal 16 during operation of the filter 300. Thus, the filter 300 provides an extremely narrow photonic bandpass filtration that can be swept through a very wide photonic spectrum. Thus, the apparatus 302 constitutes a hyper-resolution, broadband, photonic, spectrum analyzer 302.

The resolution limitation of the dynamic, active filter 300 may be as narrow as the line width available in the photonic reference signal 16. This may typically be the line width of a source laser for the application. The bandwidth may vary somewhat, but will typically lie within the order of magnitude of such a line width of the reference signal 16. The breadth or width of the spectrum or spectra that can be analyzed by the apparatus 302 is only limited by the sweep range of any available combination of sources for the reference signal 16.

Multiple photonic sources may be used in combination, each having its own sweep range, in order to provide coverage over an arbitrarily large spectrum. Considering the frequencies and bandwidths at which photonic devices may operate, an apparatus 302 in accordance with the invention may be the only way in which certain photonic processes can be monitored.

In certain selected embodiments, the reference signal 16 may be configured to represent a waveform 21 varying in any of the available and arbitrary domains of interest. Accordingly, the waveform 21 of the reference signal 16 may be as sophisticated as desired in order to create photonic fingerprints of arbitrary shape and complexity. For example, given a waveform 21 having variations in a selected number of domains, the photonic reference signal 16 may be configured to filter across a broad spectrum searching for a matching fingerprint wave form coherent in all the domains of interest. Moreover, domains not of interest may be bypassed, while only those domains of interest are filtered or tested. Similarly, all available domains characterizing the waveform 21 may be relied upon as filtration criteria by the filter 300.

The reference signal 16 may be from one of several sources. For example, the source may be a simulated source available by mathematical analysis and generation of a signal. Similarly, a synthesized source having only certain desired characteristics may be created absent other sources that are simulated. Moreover, a waveform 21 may be generated for the signal 16 directly from a naturally occurring, and even unknown and unrecognizable fingerprint 21. Accordingly, the reference signal 16 may produce a histogram-like signature of energy associated with a molecule, chemical compound, atomic frequency, or the like, which, without analysis or decomposition, may be delayed, recorded, or synthesized to be used for it's coherence to detect itself in another signal 18.

For example, a photonic source, such as a laser, may be fabricated, using a material of interest or molecular structure of interest as the resonant lasing medium for generating a photonic fingerprint 21 or waveform 21 as a reference signal 16. Materials will exhibit certain fingerprints 21 or waveforms 21 characteristic of their atomic and molecular structures. Accordingly, such compositions as water, hydrogen, atomic elements available in the periodic table, DNA, particular viruses, chemical compounds associated with viruses, bacteria, and the like, and so forth may all be used as source materials as generating a photonic signal and fingerprint 21 as a reference signal 16. Sources for the reference signal 16 need not be limited to organic nor inorganic, nor naturally occurring materials or phenomena.

Moreover, reference sources 16 may be used, from whatever suitable source, in order to analyze such diverse input signals 18 as the fingerprints 21 (waveforms 21) originating from organic compounds, inorganic compounds, synthesized compounds, stellar spectra, pharmaceutical compounds, intermediate species in chemical processes, products of combustion during the combustion process itself, or other dynamic chemical process analysis (during the immediate course of a chemical reaction occurrence).

In certain embodiments, an apparatus 302 in accordance with the invention may be applied to conduct a spectral analysis of a wave-division multiplexed signal traveling in a carrier medium. For example an optical fiber may carry signals that can be beneficially analyzed for their content.

It would be advantageous to be able to provide fingerprints 21 of biological processes in situ and in real time. Accordingly, an apparatus 302 in accordance with the invention may be applied to conduct spectral analysis of biological materials and processes at sampling speeds or frequencies higher than any significant change in state, condition, reaction, or other parameter of interest that may be completed by a biological organism or material.

Figure 22:
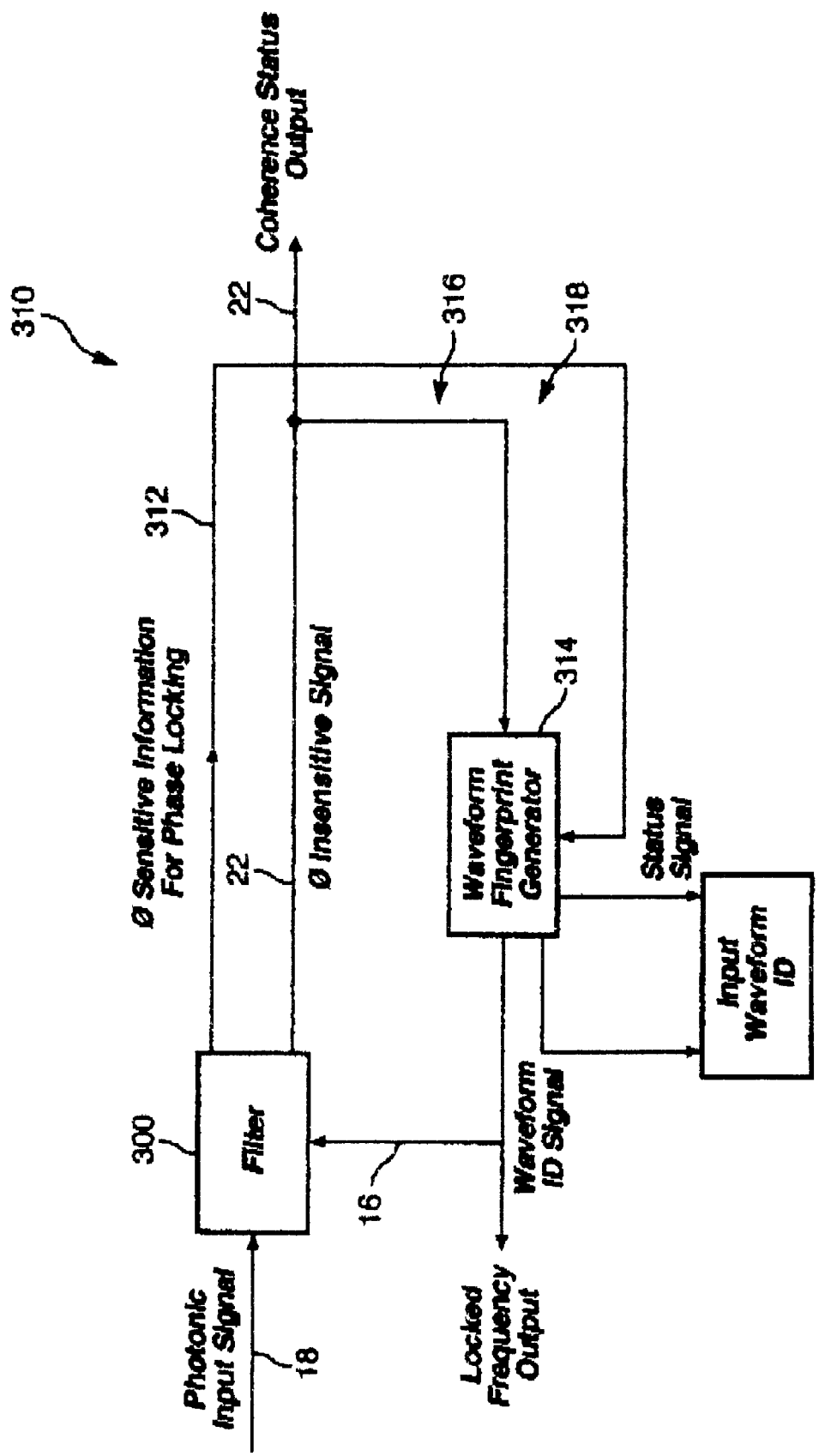
FIG. 22 is a schematic block diagram of coherence detection in accordance with the invention used for providing a phase-locking apparatus and method relying on coherence detection.

Referring to FIG. 22, an apparatus 310 in accordance with the invention may receive a photonic input signal 18. In the apparatus illustrated, a filter 300 provides an output 22. This may be output directly as shown, and may also be fed back to a frequency selection servo 314. The servo 314 may be configured to render a frequency selection, and also to be adjustable to modify frequency in accordance with the value of the signal 22. The servo 314 thus provides the reference signal 16 for controlling the filter 300. As a result, the frequency-locked loop 316 can lock into any desired waveform 21. Additionally, from the filter 300 may proceed or may be extracted a phase-sensitive signal for phase-locking operations. For example, the signal 312 may be fed back to the servo 314 in order to lock in the phase of the loop 316.

Some of the applications for which the apparatus 310 may be suitable include ultra-high density wave-division multiplexing, properly characterized as being of hyperdensity. Other applications may include detection, lock-on, or both for any of the fingerprint 21 or waveforms 21 described with respect to the apparatus 302 of FIG. 21.

Figure 23:
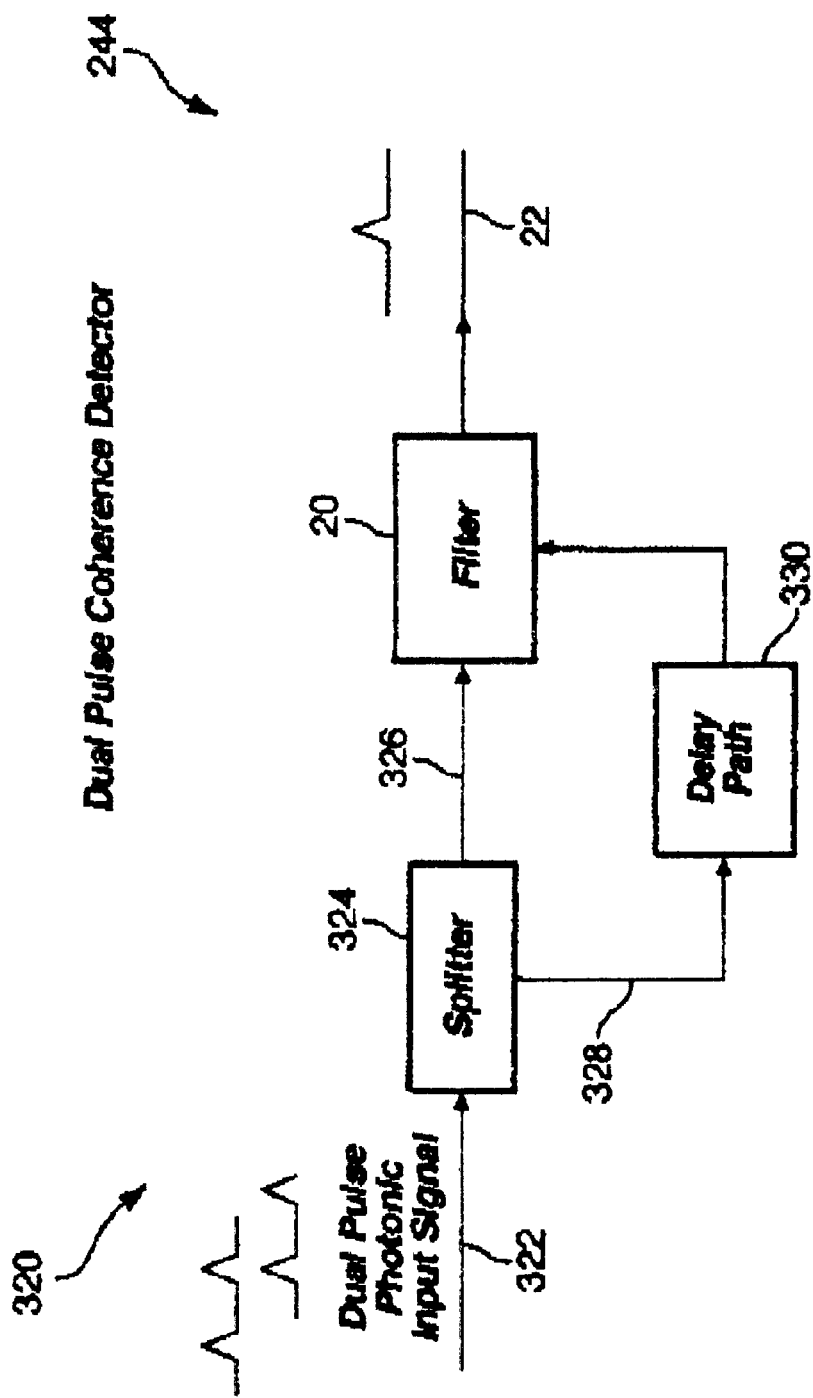
FIG. 23 is a schematic block diagram of a dual pulse coherence detector in accordance with the invention.

Referring to FIG. 23, an apparatus 320 may serve as a delay-domain demultiplexer as described in U.S. patent application Ser. No. 09/690,676 incorporated herein by reference. In accordance with the present invention, the filter 300 may be configured to provide phase-compensated, coherence detection by use of a phase-compensated, coherence-detection interferometer incorporated into the filter 300. One beneficial result of using a phase-compensated, coherence-detection interferometer in the filter 300 is a stabilization of the apparatus 320. This automatically compensates for phase changes occurring within the apparatus 320 as a result of mechanical vibration, variations in temperature over or throughout the apparatus 320, changes in phase resulting from aberrations or variations within a transmitter, or any phenomenon that may alter the phase relationship between the output signals 326, 328 received from the splitter 324. Thus, the signal 322 may be relied upon as a reference (a dual-pulse photonic input signal 322) in order to provide an output signal 22 that is phase-locked between the dual pulses. That is, the pulses in the input signal 322 are phase-locked with respect to one another.

Figure 24:
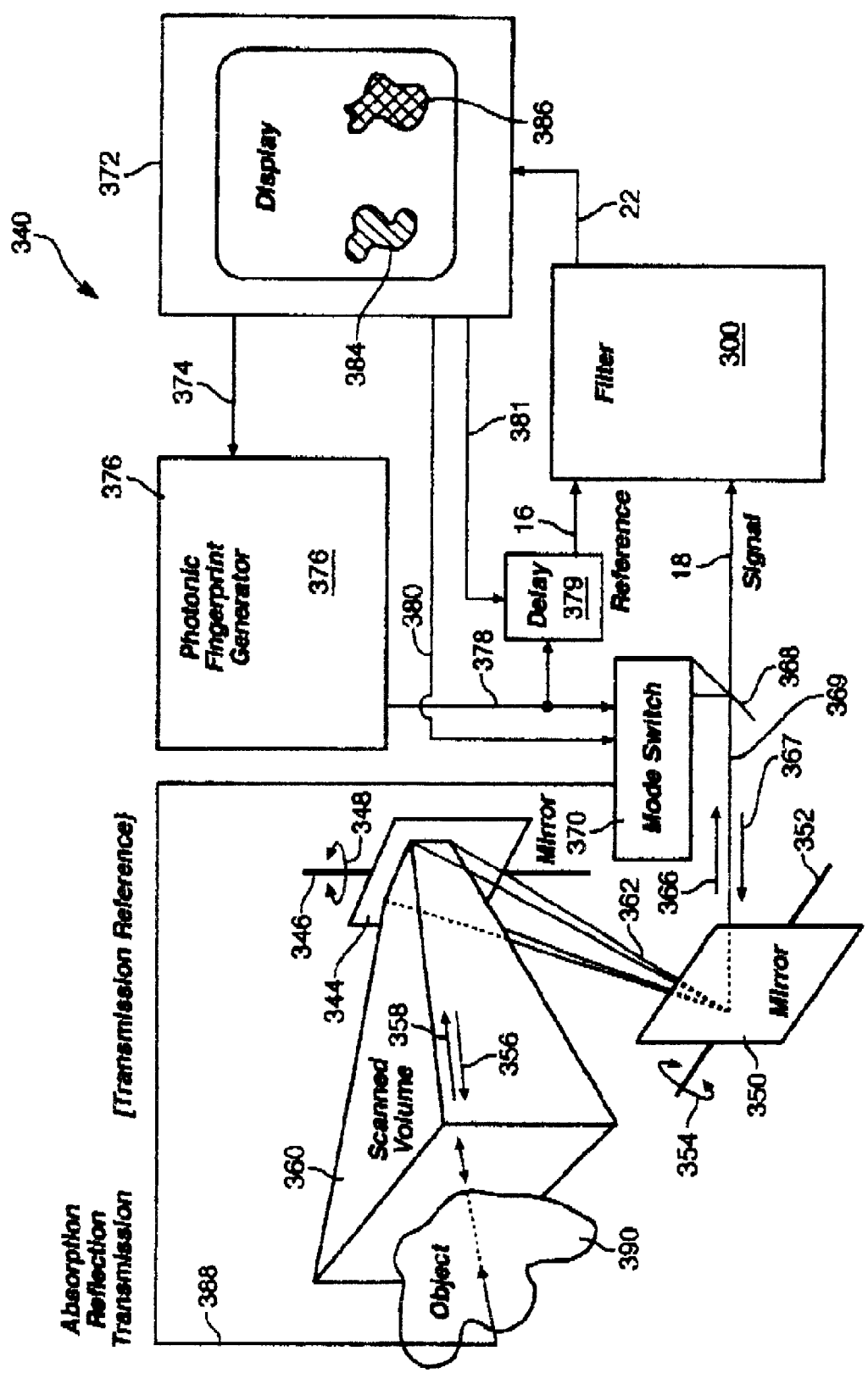
FIG. 24 is a schematic block diagram of one embodiment of a photonic fingerprint detection and display apparatus and method in accordance with the invention.

Referring to FIG. 24, an apparatus 340 may include a photonic scanner 342. The photonic scanner 342 may include, for example a mirror 344 rotating about an axis of 346 in a direction 348. Similarly, a corresponding mirror 350 may pivot about an axes 352 in a direction 354. Meanwhile, energy may be transmitted to and from the mirror 344 in directions 356, 358, respectively.

Energy may be embodied in a beam swept through a scanned volume 363. Accordingly, directional transmission may operate through the intermediate volume 362 or beam volume 362 reflecting transmission between the mirrors 344, 350. Similarly, energy may be transmitted in a directed beam in either direction 366, 367 toward or from a mirror 368. In certain embodiments, a mirror 368 may not be required for all operations of the apparatus 340.

A mode switch 370 may be included for directing and redirecting, according to certain selections of operation, with respect to the signal 18 arriving at the mirror 368. An image display 372 may be part of a controller, console, computer, or the like, providing a signal 374 controlling a fingerprint generator 376. The fingerprint generator 376 may provide a photonic reference signal 378. A photonic reference signal 378 may proceed to the mode switch 370, and subsequently to the mirror 368.

Alternatively, the reference signal 378 may pass to an optional delay mechanism 379 configured to process the reference signal 378 into a signal 16 passed as a reference to the filter 300. In certain embodiments, a signal 380 may pass from a computer, controller, console, or the like associated with the display 372 in order to provide operational control to the mode switch 370. Similarly, a control signal 381 may come from a similar device associated with the display 372 for controlling the delay in the delay mechanism 379. Ultimately, the reference signal 16 and the incoming compared signal 18 arrive at the filter 300. The filter 300, in turn, provides an output 22 directed to the display 372 and any console, control, computer, processor, or the like associated therewith. The display 372 may display images 384, 386 representing phenomena occurring in a domain identified with a waveform 21 or fingerprint 221 as described previously.

From the mode switch, a signal 388 may proceed to an object 390 being scanned by the mirror 344. The object 390 may be significant in one, two, three dimensions, or more. In certain embodiments, the object 390 maybe capable of absorption, reflection, scattering, transmission, or any combination thereof. The object 390 may be stationary, or may be in motion during the scan by the mirror 344. In certain embodiments, the coordinate system of the scan of the mirror 344 may be either Eulerian or Lagrangian. Accordingly, the object 390 may move through a space scanned by the mirror 344, or the space being scanned may move through or past an object 390.

Also, in selected embodiments, the object 390 may be an ongoing process or volume of space undergoing a process, such as a chemical reaction. Accordingly, the nature of the object 390 may be in a gas phase, a liquid phase, or solid phase. Similarly, due to the nature of thermodynamics, the object 390 may actually exist in a combination of the phases (liquid, gas, solid, plasma, etc.) and the state or phase of the object 390 may vary in time and space.

Due to the fact that the scan by the mirror 344 occurs in finite time, the scan will not necessarily ever capture a single physical state at a single instant of time. That is, the image itself may be time dependent. Nevertheless, the filter 300 may compare successive images, and thus provide information concerning the change, rate of change, state, etc corresponding to any particular location in the object 390. By appropriate operation of the delay mechanism 379, a delay may be imposed on the reference signal 16 with respect to the compared signal 18.

Since the signal 378 passes through the mode switch 370 to the mirror 368 and ultimately across the mirror 344, a reflection thereof in the direction 358 will ultimately arrive back as part of the signal 18. The path difference creates a delay. Thus, the optional delay mechanism 379 may be controlled to provide a series of potential delays, one of which may provide a coincidence with the signal 18 and the signal 16. Therefore, spacial depth as a distance from the mirror 344 is detectable as a direct result of the delay of the delay mechanism 379, providing coincidence between the signals 16, 18 in the filter 300.

Figure 25:
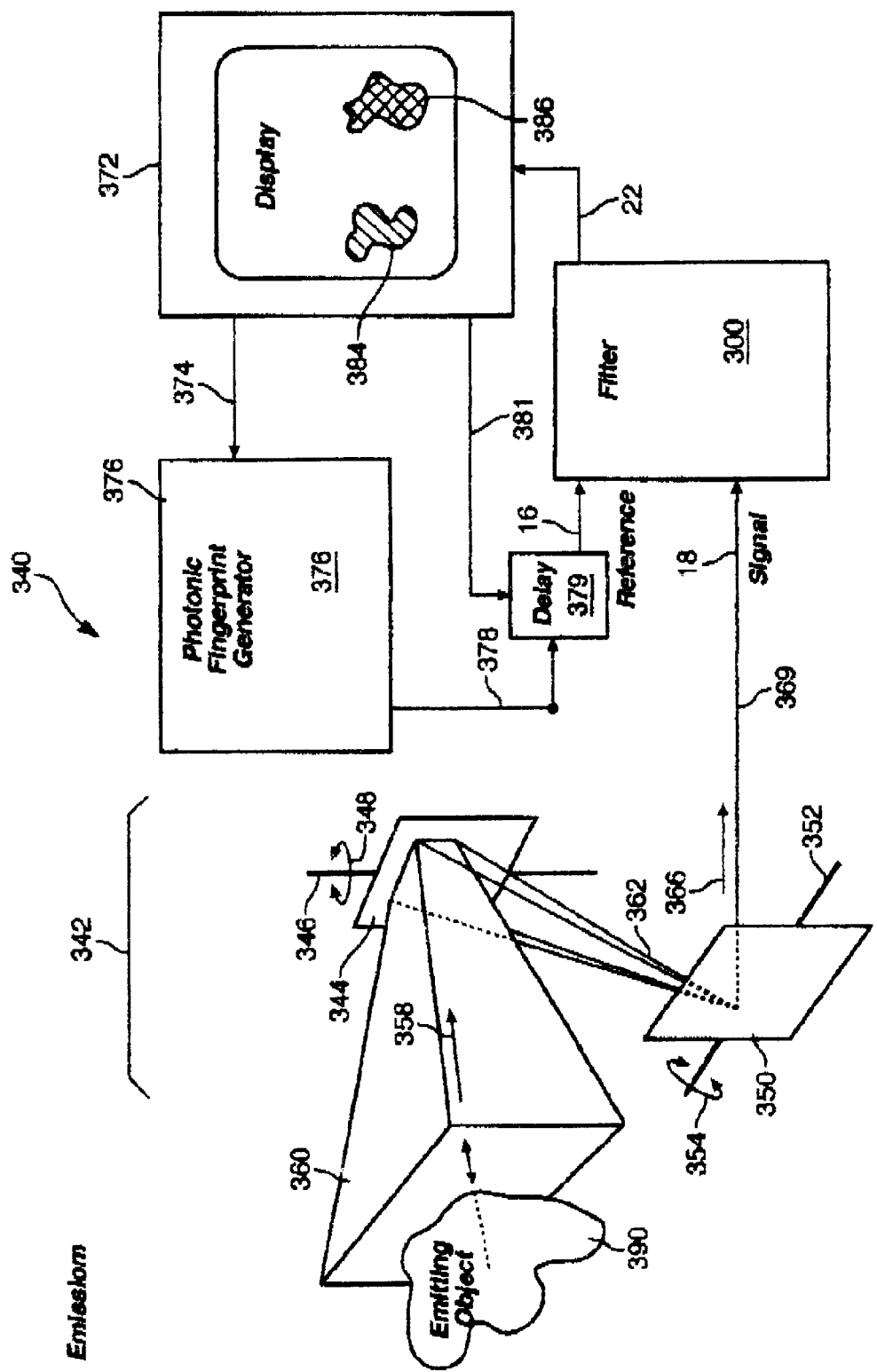
FIG. 25 is an alternative embodiment of a photonic fingerprint detection mechanism in accordance with the invention.

Referring to FIG. 25, the apparatus 340 may be modified or configured in any particular manner to utilize the elements illustrated. For example, an emitting object 390 may generate energy to be scanned within the volume 360 by the mirror 344. The beam passed from the mirror 344 to the mirror 350, ultimately passes as the compared signal 18 into the filter 300. Meanwhile, a photonic fingerprint generator 376 may provide a signal 378 having a waveform such as the multi-dimensional waveform 21. If the mode switch 370 is used in this embodiment, it may be configured to receive a control signal from any direction, including the signal 380. Nevertheless, in certain embodiments,the apparatus 340 maybe constructed with out a mode switch 370, in order to operate only in a particular mode. Thus, the configuration of FIG. 25 is an "emission" mode.

The signal 378 is propagated from the photonic fingerprint generator 376 toward the filter 300 as the reference signal 16. The delay mechanism 375 is an optional element that may or may not be used, according to the operational requirements. For example, the fingerprint generator may actually use the incoming energy originally derived from the emitting object 390 as a fingerprint. Nevertheless, in alternative embodiments, the photonic fingerprint generator 376 may generate a fingerprint from previous history, synthesized characteristics, or the like in order to produce a signal 378. In any event, the fingerprint generator 376 maybe completely capable of determining a time of arrival for the signal 378, and thus obviate the need for the delay device 379.

As a practical matter, the scanner 342 may receive control information from the photonic fingerprint generator 376 in order to provide registration (in time) of the signals 16, 18. Thus, the photonic fingerprint generator 376 may provide or receive a scanning synchronization signal related to the scanner 342. In certain embodiments, the mirrors, 344, 350 may scan a closed loop pattern controlled by the photonic fingerprint generator 376 or by some computational facility associated with the display 372. So long as the synchronization in possible between the signal 16, and signal 18, the location and other significance thereof may be determined analytically.

Upon condition of coherence coincidence between waveforms 21 within the filter 300 (as a result of the inputs 16, 18), an output 22 is produced as described previously herein. The signal 22 serves as the impetus for the display 372, constituting a representation 384, 386 for the region and state of interest ill the emitting object 390, as scanned by the scanner 342.

As a practical matter, like the control relationships between the scanner 342, the photonic fingerprint generator 376, and the computational facility of the display 372, physical registration information is shared between the display 372 and the scanner 342. The registration information may originate with the scanner 342, or may be imposed by the computational facility of the display 372 upon the scanner 342. In any event, the significance of registration information is to provide a map between the locations within the scanned volumes 360, and ultimately, the emitting object 390, and the representations 384, 386 shown on the display 372.

Some of the applications in which an emitting object 390 might be scanned by the apparatus 340, providing an extremely high resolution in space,time, and in the value of any photonic-energy-related parameter, may include: dynamic observation of chemical processes, such as reactions and combustion; precise tracking of objects in near or far space, including microscopic observation, telescopic observation, and any intermediate range of observation; recording and mapping of locations of emitted objects 390 with respect to each other, in an absolute reference frame, or within the reference frame of the scanned volume 360. As a practical matter, no absolute reference frame exists, but a reference frame may be created or established with respect to any physical entity, including the surface of the earth or any location where the apparatus 340 may be positioned.

Figure 26:
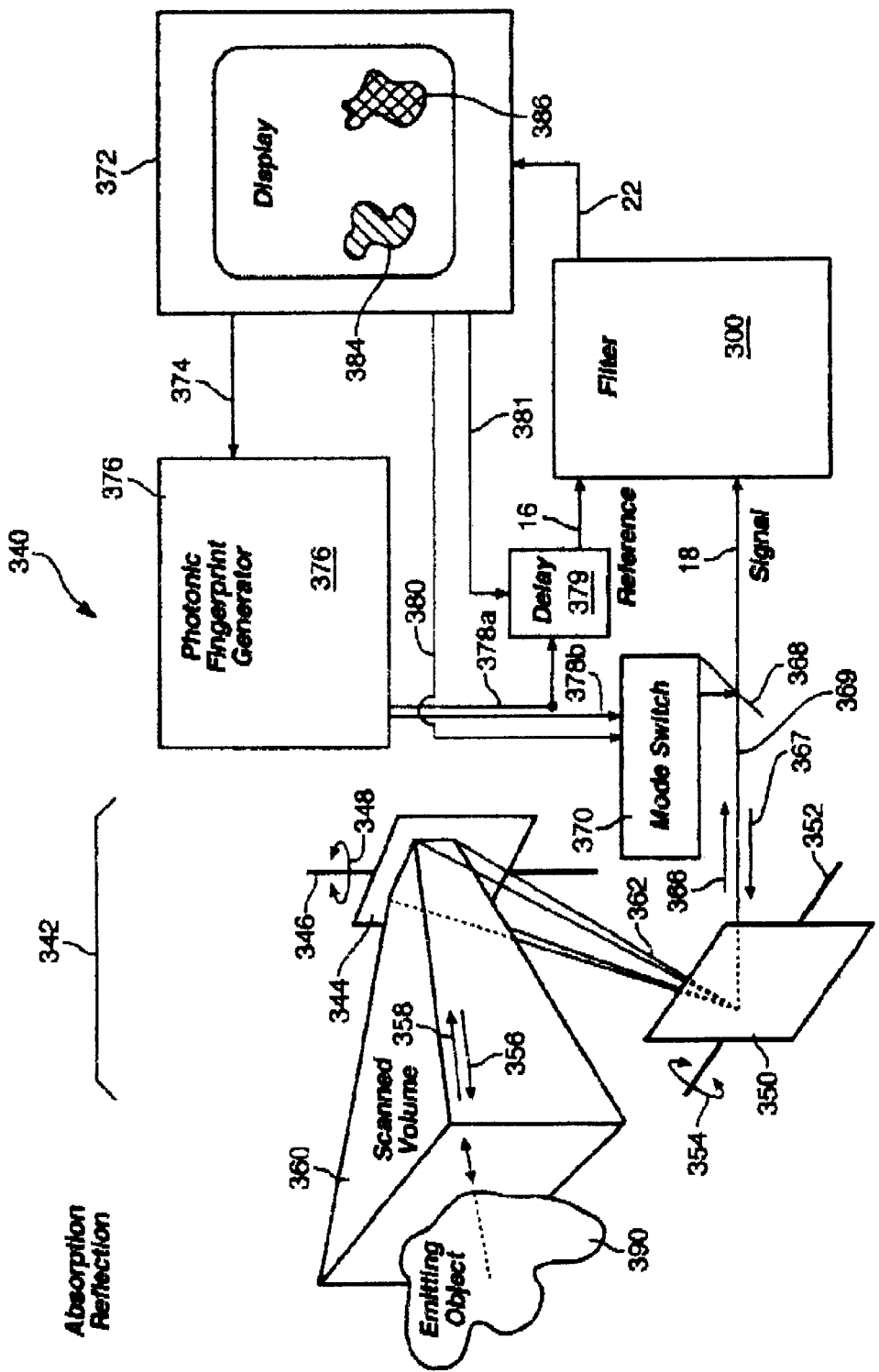
FIG. 26 is a schematic block diagram of an alternative embodiment illustrating additional details for a fingerprint detection apparatus and method in accordance with the invention.

Referring to FIG. 26, a signal 378 may be generated to serve as a reference signal 16 to the filter 300. The signal 378 may pass through a splitter or be otherwise divided to send a signal to the mirror 368. The signal 378 arriving at the mirror 368 travels in the direction 367 toward the mirrors 350, 344 in sequence. Ultimately, the energy from the signal traveling along the path 369 toward the mirror 350 will be reflected by the mirror 344 to the object 390. In this embodiment, the object 390 is a reflecting object 390 and reflects energy received from the direction 356 back in the direction 368 toward the mirrors 344, 350, 368. This energy ultimately passes to the filter 300 as the compared signal 18. The partially reflecting mirror 368 causes signals passing in the direction 366 and the direction 367 to be coaxial, or even collinear in order to provide registration of any particular location on the reflecting object 390. The mirror 368 is aligned so that the signal 378 and the signal 18 strike the mirror 368 at the same location moving away from and toward respectively, the filter 300. Although both signals 18, 378 strike the mirror 368 at the same location, they are orthogonal. If registration is not relied upon, then the angular difference, parallax, or other lack of alignment may be accommodated by other methods.

In certain embodiments, the fingerprint generator 376, during successive frames scanned by the scanner 342, may generate or otherwise rely on different fingerprints 121. Accordingly, the display 372 may actually present multiple images 384, 386 characterizing distinct fingerprints at their own distinctive locations on the reflecting object 390. The difference in location of the images 384, 386 maybe due to a change in time, a change in frequency, or a change in any other parameter that is being used as a significant characteristic of the fingerprint 21 provided by the photonic fingerprint generator 376.

In certain embodiment, the signal 378 may actually be represented by two signals 378a, 378b. In such an embodiment, the signal 378a is passed through the delay device 379, while the signal 378b is a different signal having a different fingerprint 21. Thus, as in Raman spectroscopy, a fingerprint 21 associated with the signal 378b provides the excitation energy projected onto the reflecting object 390. The reflecting object then re-emits energy having a different fingerprint, in the direction 358, as the signal 18 to be compared with the reference signal 16.

The phase insensitivity of an apparatus in accordance with the present invention is valuable for examining the photonic products of Raman spectroscopy in that such may arrive with random phases that would otherwise cause difficulty with another interferometric art. Vibrations in the apparatus, especially in the scanning system are mitigated by the phase-insensitivity, enabling the invention to accomplish tasks heretofore impossible and commercially impracticable.

Radar-ike topographical mapping of a target 390, with or without stereoscopic parallax, using multiple images produced by an apparatus in accordance with the invention may be processed by a computer with artificial phase information injected to provide synthetic holograms. Such holograms may display a target in three-dimensions without having to deal with handling the actual phase differences embodied in the data associated with a moving target, for example, or moving components within the apparatus.

As illustrated in FIG. 26, some of the applications for which the configuration of the apparatus 340 are adapted or may be adapted may include: biological material characterizations, chemical characterizations, pharmaceutical compound characterizations, surface coating characterizations, remote sensing of flora and fauna resources, surveys of other organic and inorganic natural resources on the surface of the earth, characterization of living organisms, nondestrictive testing of structural materials, topographical analysis from which synthesized holograms may be produced, and any other detection process that may benefit by or distinguish itself by virtue of reflection or reemission processes.

Figure 27:
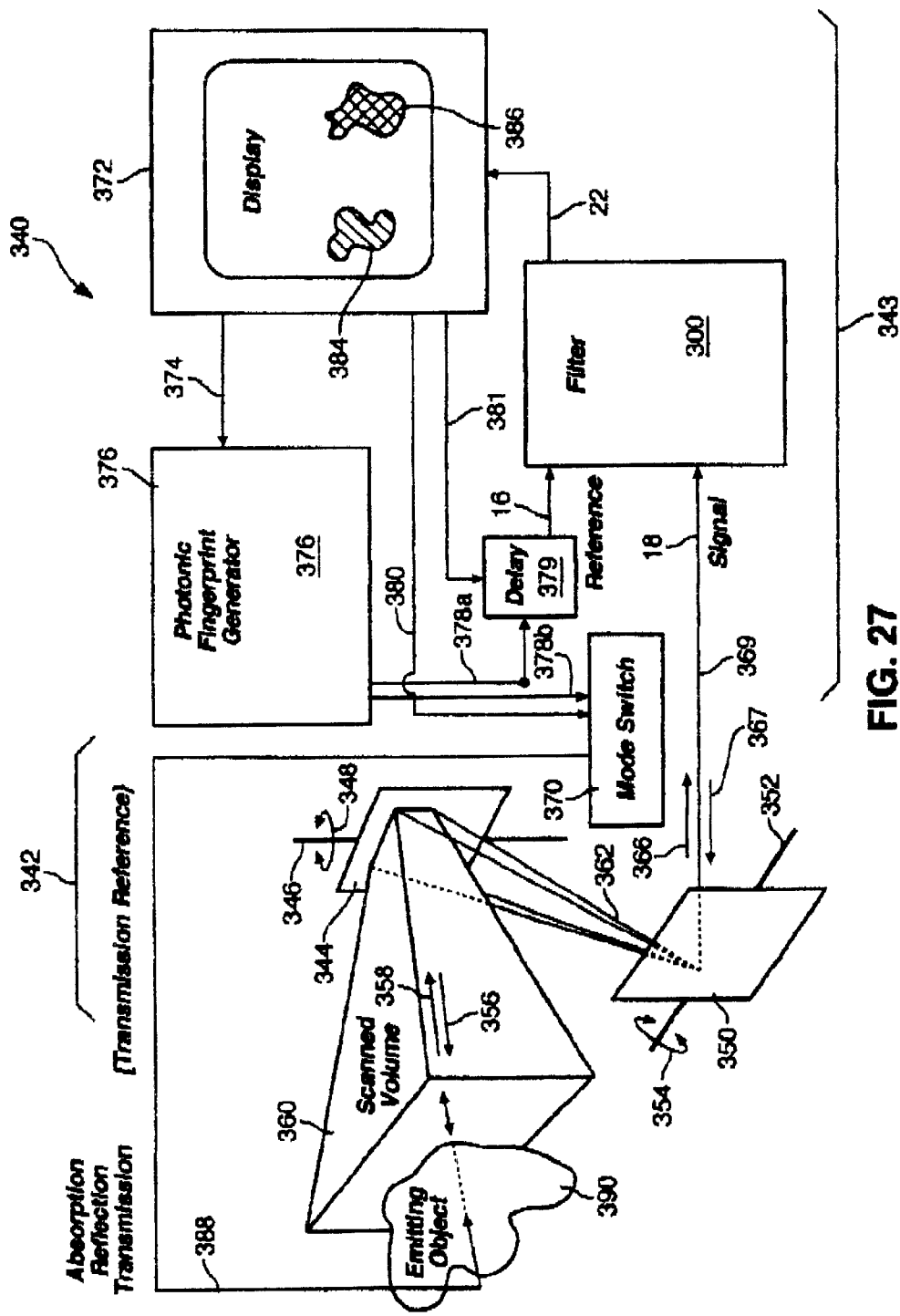
FIG. 27 is a schematic block diagram of an alternative embodiment illustrating additional details for a fingerprint detection apparatus and method in accordance with the invention.

Referring to FIG. 27, the apparatus 340 may be configured as a hyper-resolution, scanning, multi-domain, fingerprint coincidence processor for transmitted energy through a transmitting object 370. In this embodiment of an apparatus 340 in accordance with the invention, a photonic fingerprint generator 376 may provide a source signal 378b through the mode switch 370 to become the signal 388. The signal 388 may be projected on and through the transmitting object 390. As a practical matter, the object 390 may actually be capable of transmission, scattering, reflection, absorption, and re-emission. However, in the case at hand, the transmitting properties of the object 390 are of most significance. A transmitted signal 388 passes through the object 390 (at least partially) in the direction 358 toward the mirror 344. The reflected beam 362 passes from the mirror 344 to the mirror 354, and ultimately to the filter 300 as the compared signal 18.

Meanwhile, the photonic fingerprint generator 376 provides a reference signal 16 to the filter 300. The reference signal 16 may pass through a delay device 379 (optional) as described above. Two signals 16, 18 are compared by the filter 300, which only provides an output 22 in the circumstance wherein the waveforms 21 (fingerprints 21) of the signals 16, 18 match. The signals 378a, 378b may have identical waveforms 21, or different waveforms 21. The particular waveform 21 used by either the signal 378a, or the signal 378b, or both, maybe selected. This is performed according to a criterion by which a particular property of interest, corresponding to the transmitting object 390, may be distinguished, analyzed, differentiated, or otherwise scanned.

Thus, an apparatus 340 in accordance with the invention may be configured as a four-dimensional photonic, fingerprint analyzer. The analyzer 340 may be configured to operate based on absorption of photonic energy, reflection, scattering, transmission, re-emission, or any combination thereof In selected embodiments, the analyzer 340 may also be used to determine amounts of energy directed to any of the effects discussed, and there proportions.

Figure 28:
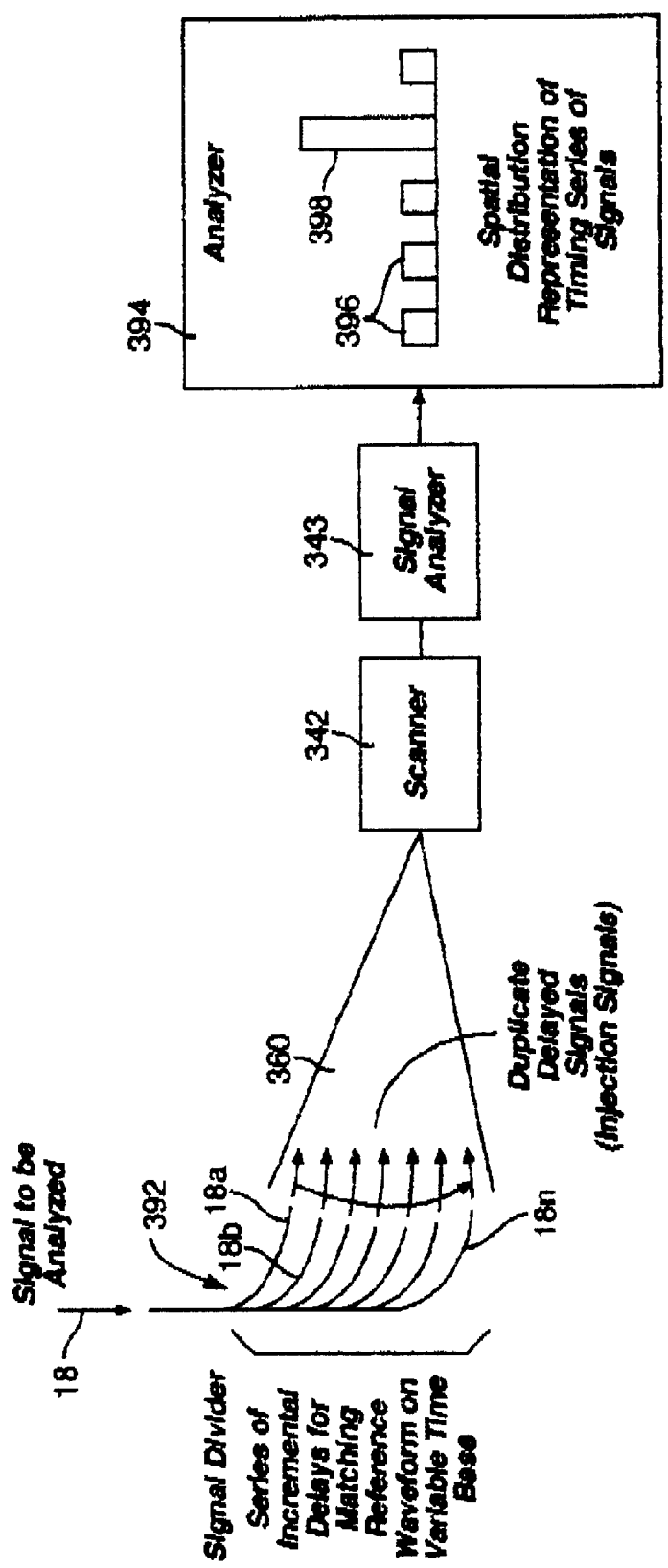
FIG. 28 is a schematic block diagram of one embodiment of an apparatus and method for analyzing signals using delay-domain techniques, in conjunction with a representation spatially distributing output signals.

Referring to FIG. 28, an input signal 18 maybe divided by splitters 392 providing multiple replicas or copies of the complex signal 18, each having a delay with respect to an adjacent signal 18. The signals 18 may be scanned throughout the scanned volume 360 by the scanner 342. A scanner 342, due to the geometric consideration and the arrangement of the signals 18 (copies of the signal 18) distributed to different locations in space, provides a sequenced array of copies of the signal 18. In a circumstance where the fingerprint of the signal 18 may be unknown, the signal analyzer 343 may provide a series of candidate fingerprints for comparison with the sequential array of duplicate delayed signals 18a, 18n. Thus, as illustrated, the analyzer 343 provides to a display 372 a representation 394 of the mapping of the delayed signals 18a–18n to screen positions.

Accordingly, various images 396 represent the individual delayed signals 18a. Moreover, magnitudes or other representations of the signals 18a–18n indicate (by the representation 396) the degree of correlation between the signals 18a–18n and the candidate reference signal 16 provided from the signal analyzer 343. Thus, for example, the image 398 indicates a high degree of correlation corresponding to a hit or match between a particular one of the duplicate delayed signals 18a–18n, and a candidate fingerprint 21, provided as the signal 16 by the signal analyzer 343.

Figure 29:
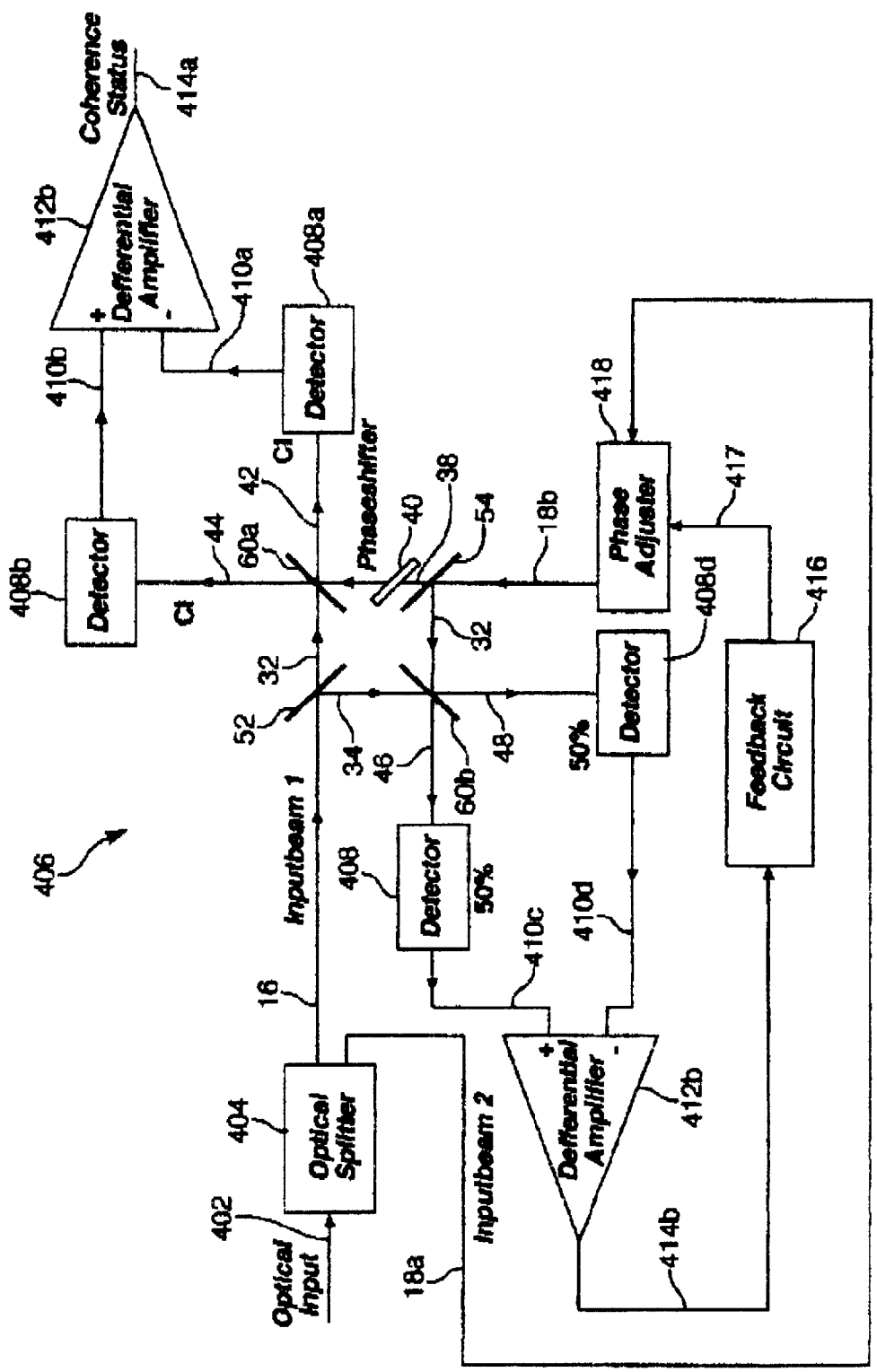
FIG. 29 is a schematic block diagram of a compounded embodiment of an apparatus using servo mechanisms for phase stabilization in combination with other features of the invention.

Referring to FIG. 29, an input signal 402 may pass into a photonic splitter 404, resulting in intermediate beams 16, 18. The input 16 passes into a interferometric module 406, consistent with the systems described above (see e.g. FIG. 16). The module 406 provides signals 42, 44 to the detectors 408a, 408b, respectively. Outputs 410a, 410b from the detectors 408a, 408b pass to the differential amplifier 412a. The amplifier 412a outputs the coherence status output 414a.

Meanwhile, the interferometric module 406 outputs the signal 46, 48 to the respective detectors 408c, 408d. The detectors provide signals 410c, 410d to the differential amplifier 412b. The resulting output 414b operates as an input to a feedback circuit 416 for processing. The feedback circuit 416 provides an input 417 into a phase adjuster 418. The phase adjuster 418 adjusts the signal 18a and outputs the now phase-adjusted signal 18b as the second input to the interferometric module 406. Thus the relative phase of the signals 16, 18a is adjusted to properly output the CI and DI signals when the beams 16, 18a are coherent.

As a practical matter, the inputs 16, 18a may actually come from separate sources. Thus, the splitter 404 is actually more of a curiosity for the laboratory, representing the possibility of the signals 16, 18a coming from a nearby single source and being subjected to variations in phase due to intervening events in the lines 16, 18a.

The feedback circuit 416 functions to assure that the signals 410c, 410d are matched in amplitude and phase when exiting the detectors 408c, 408d. This circuit may provide a very stable, repeatable mechanism for error correction in the phase. Consequently, outputs 42, 44 will produce optimized, maximum CI and minimized DI when the signals 16, 18a are coherent.

Figure 30:
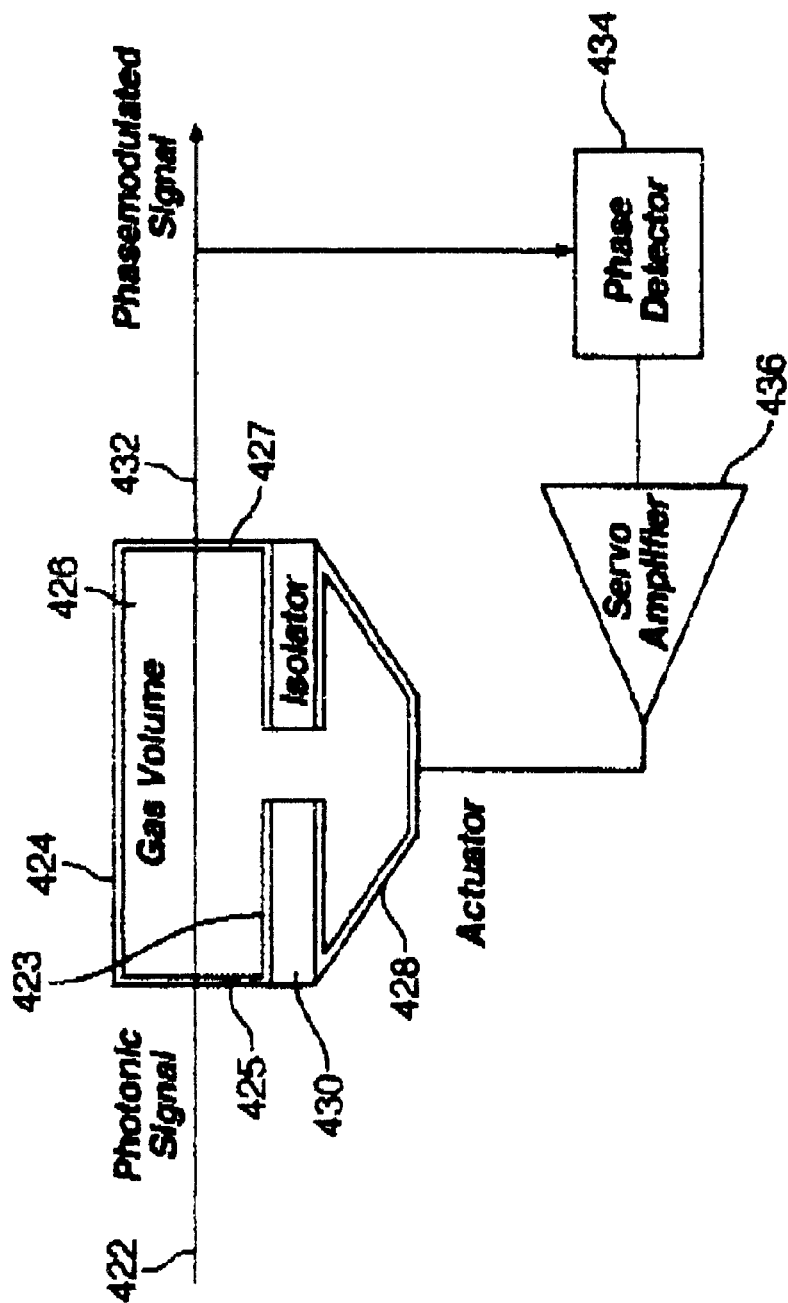
FIG. 30 is a schematic diagram of one embodiment of a servo operating at audio frequencies and damped to isolate an actuator for a fast and stable response in varying phase by altering an index of refraction.

Referring to FIG. 30, one embodiment of isolation for a servo-control may involve a photonic signal 422 passing through windows 426, 427 of a vessel 424 having walls 425 containing a gas 426. The actuator 430, changing the pressure of the gas 426 in the vessel 424, alters the index of refraction of the gas 428, thus adjusting the phase of the phase-modulated signal 432. The detector 434 may detect the phase of the signal 432, feeding back a signal to the amplifier 436 driving the actuator.

As a practical matter, it has been discovered that isolating the wall 423 from the actuator is important to removing mechanical vibrations from the system. Isolation has been done effectively by connecting to a passage with a damper material 430. Suitable mechanisms for a damper include a length of resilient or compliant tubing, particularly if the actuated volume 440 is completely isolated mechanically from the wall 423.

Thus, the actuator volume may move gas 427 through the passage 440 into the volume 426 byway of a tub configured to provide minimal or no transmission of force between the actuator 428 and the wall 423. In other embodiments, the damper 430 or isolation material maybe an expanded polymer providing no significant force transmission between the actuator and the wall. Fasteners may include any suitable type including mechanical fasteners, adhesives, solvents, and the like.

From the above discussion, it will be appreciated that the present invention provides methods and apparatus for detection of coherence in multiple domains for a waveform, and using the lack of or presence of coherence to perform a multiplicity of useful functions. Some of those functions include phase-insensitive coherence detection, multi-domain differential coherence detection, holographic manufacture in-place for lenses and holograms in order to maintain more precise registration of components, and various types of electronic and photonic signal processing and post-detection processing. Also available are functions including hyper-sensitive bandpass filtering at zero beat frequency, such as the hyper-selective, direct-conversion filtering apparatus and method. Hyper-heterodyning, expanded bandpass apparatus and methods are also available. Hyper-resolution, broadband spectrum analyzers and multi-dimensional, photonic waveform fingerprint analyzers are also contemplated. The technology may also produce a frequency-locked photonic loop, a phase-compensated coherence detection interferometer and a multiple-phase-mask interferometer with a broadband phase mask, relying on a projected phase mask. Other benefits may include holographic TV, three-dimensional projectors, and a three-dimensional-imaging camera.

In short, various apparatus and methods in accordance with the invention may provide multi-domain, phase-compensated, differential-coherence detection of photonic signals for interferometric processes. Devices may be manufactured holographically and developed in situ or with an automatic registration between holograms and photonic sources in a single frame. Photonic or electronic post processing may include outputs from a cycling or rotation between differently phased complementary outputs of constructive and destructive interference. A hyper-selective, direct-conversion, expanded-bandpass filter may rely on an expanded bandpass for ease of filtering, with no dead zones for zero beat frequency cases.

A hyper-heterodyning, expanded bandpass system may also provide improved filtering and signal-to-noise ratios. An ultra-high-resolution, broadband spectrum analyzer may operate in multiple domains, including complex "fingerprints" of phase, frequency, and other parameters. The associated technologies of the invention may be used to produce extreme precision in multi-domain locking of sophisticated waveforms varying in several domains.

Phase-masking techniques may provide phased arrays of complementary outputs over a broad band, such as may be implemented in a projected phase-mask,multiple phase interferometer. Topographic holographic imaging and projection techniques are enabled at very fine resolutions, while minimizing required information for systems such as holographic television. Phase-stabilization, modulation, compensation and the like are enabled by devices and methods in accordance with the invention, and may be servo-controlled.

The present invention may be embodied in other specific forms without departing from its essential characteristics. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A method for phase modulation of a photonic signal, the method comprising:

providing a photonic input signal to be modulated;

providing an actuator for driving phase modulation;

providing a volume of gas, transparent to photonic signals and configured for passing the photonic signal therethrough; and controlling the actuator to change the density of the gas at a frequency corresponding to the acoustical spectrum, for controlling the index of refraction thereof, to provide a phase modulated signal.

2. The method of claim 1, wherein the actuator is an electro-mechanical actuator.

3. The method of claim 1, wherein changing the density further comprises changing the pressure in the volume of gas.

4. The method of claim 1, further comprising electro-mechanically actuating a surface in the actuator to change the pressure of the gas.

5. The method of claim 1, further comprising:

providing a first wall for containing the gas;

providing an isolator for isolating microphonic vibrations of the actuator; and securing the isolator between the actuator and the first wall.

6. The method of claim 5, wherein the isolator further comprises a resilient, compliant core, and wherein securing further comprises adhering the actuator and the first wall to opposite sides of the core.

7. The method of claim 6, wherein adhering further comprises using a bonding agent selected from an adhesive, a solvent, a welding material, applying energy, molding in place, and fitting a mechanical linkage.

8. The method of claim 6, wherein the actuator further comprises an acoustical speaker configured to form a second wall opposite the first wall and containing the gas therebetween.

9. The method of claim 6, wherein the isolator further comprises a compliant conduit configured to dampen vibrations between the first wall and the actuator.

10. The method of claim 1, further comprising:

providing the phase modulated signal to a phase detector; and feeding back a control signal from the phase detector to the actuator for phase stabilizing the phase-modulated signal.

11. The method of claim 1, further comprising:

producing, by the actuator, a wave in the gas, the wave being an acoustical standing wave positioned and oriented with respect to the photonic signal to selectively create a region of modified density in a propagation path of the photonic signal through the gas.

12. The method of claim 11, further comprising frequency modulating the standing wave to position the region of modified density within the gas in order to phase modulate the photonic signal.

13. The method of claim 12, further comprising controlling the position of the region by a photonic control signal external to the photonic signal.

14. The method of claim 1, further comprising:

directing a photonic heating signal into the gas; and absorbing the energy from the photonic heating signal by the gas to change the index of refraction thereof.

15. The method of claim 1, further comprising:

outputting the output signal to a phase detector in a servo loop;

feeding back an output of a phase detector to the actuator;

feedback controlling of the phase modulation by the actuator.

16. The method of claim 15, wherein the actuator is configured to accomplish phase modulation at acoustical frequencies.

17. A apparatus for phase modulation of a photonic signal, the apparatus comprising:

an input line configured to provide a photonic input signal to be modulated;

an actuator operably connected to drive phase modulation;

a volume of gas, transparent to photonic signals and configured for passing the photonic signal therethrough; and a controller for controlling the actuator to change the density of the gas at a frequency corresponding to the acoustical spectrum, thus controlling the index of refraction thereof, to provide a phase modulated signal.

18. The apparatus of claim 17, wherein the actuator is an electro-mechanical actuator.

19. The apparatus of claim 17, wherein the actuator is configured to change the pressure in the volume of gas.

20. The apparatus of claim 17, wherein the actuator is configured to move a surface containing the volume of gas to change the pressure of the gas.

21. The apparatus of claim 17, further comprising:

a first wall for containing the gas; and an isolator connected between the first wall and the actuator for isolating microphonic vibrations of the actuator.

22. The apparatus of claim 21, wherein the isolator further comprises a resilient, compliant core.

23. The apparatus of claim 22, further comprising a bonding agent securing the isolator to the first wall and selected from an adhesive, a solvent, a welding material, applying energy, molding in place, and a mechanical linkage.

24. The apparatus of claim 22, wherein the actuator further comprises an acoustical speaker configured to form a second wall opposite the first wall and containing the gas therebetween.

25. The apparatus of claim 22, wherein the isolator further comprises a compliant conduit configured to dampen vibrations between the first wall and the actuator.

26. The apparatus of claim 17, further comprising:

a phase detector configured to receive the phase modulated signal; and a feedback loop configured to feed a control signal from the phase detector to the actuator for phase stabilizing the phase-modulated signal.

27. The apparatus of claim 17, wherein the actuator is configured to produce in the gas an acoustical standing wave positioned and oriented with respect to the photonic signal to selectively create a region of modified density in a propagation path of the photonic signal through the gas.

28. The apparatus of claim 27, wherein the actuator is further configured to frequency modulate the standing wave to position the region of modified density within the gas in order to phase modulate the photonic signal.

29. The apparatus of claim 28, further comprising an input source for introducing a photonic control signal, external to the photonic signal, into the gas for energizing the gas in order to control the density thereof.

30. The apparatus of claim 17, further comprising:

a photonic source for introducing a heating signal into the gas; and the gas, selected to absorb the energy from the photonic heating signal to change the index of refraction thereof.

31. The apparatus of claim 17, further comprising:

a phase detector configured to receive the output signal; and a servo loop configured to feed back an output of a phase detector to the actuator, controlling the phase modulation by the actuator.

32. The apparatus of claim 31, wherein the actuator is configured to accomplish phase modulation at acoustical frequencies.

* * * * *